US009230112B1

(12) United States Patent
Peterson et al.

(10) Patent No.: US 9,230,112 B1
(45) Date of Patent: Jan. 5, 2016

(54) SECURED BOOTING OF A FIELD PROGRAMMABLE SYSTEM-ON-CHIP INCLUDING AUTHENTICATION OF A FIRST STAGE BOOT LOADER TO MITIGATE AGAINST DIFFERENTIAL POWER ANALYSIS

(71) Applicant: Xilinx, Inc., San Jose, CA (US)

(72) Inventors: Edward S. Peterson, Rio Rancho, NM (US); Roger D. Flateau, Jr., San Jose, CA (US); James D. Wesselkamper, Albuquerque, NM (US); Steven E. McNeil, Rio Rancho, NM (US); Jason J. Moore, Albuquerque, NM (US); Lester S. Sanders, Albuquerque, NM (US); Lawrence C. Hung, San Jose, CA (US); Yatharth K. Kochar, Hyderabad (IN)

(73) Assignee: XILINX, INC., San Jose, CA (US)

( * ) Notice: Subject to any disclaimer, the term of this patent is extended or adjusted under 35 U.S.C. 154(b) by 349 days.

(21) Appl. No.: 13/775,151

(22) Filed: Feb. 23, 2013

(51) Int. Cl.
*G06F 9/00* (2006.01)
*G06F 15/177* (2006.01)
*G06F 21/57* (2013.01)
*G06F 9/44* (2006.01)
*G06F 21/76* (2013.01)

(52) U.S. Cl.
CPC ............ *G06F 21/575* (2013.01); *G06F 9/4401* (2013.01); *G06F 9/4406* (2013.01); *G06F 9/4416* (2013.01); *G06F 21/76* (2013.01)

(58) Field of Classification Search
CPC ... G06F 9/4401; G06F 9/4406; G06F 9/4416; G06F 21/76
See application file for complete search history.

(56) References Cited

U.S. PATENT DOCUMENTS

| 7,117,352 | B1 * | 10/2006 | Giles et al. ................ 713/2 |
| 2005/0125396 | A1 | 6/2005 | Liu |
| 2006/0026429 | A1 | 2/2006 | Kudo et al. |
| 2006/0090084 | A1 * | 4/2006 | Buer .................... 713/189 |
| 2007/0038685 | A1 | 2/2007 | Chan et al. |
| 2008/0126779 | A1 * | 5/2008 | Smith ................... 713/2 |
| 2008/0141017 | A1 | 6/2008 | McCoull et al. |
| 2008/0256366 | A1 | 10/2008 | Dale et al. |
| 2009/0089570 | A1 | 4/2009 | Andrianov |
| 2009/0204803 | A1 | 8/2009 | Cox et al. |
| 2009/0327680 | A1 | 12/2009 | Dale et al. |
| 2010/0070749 | A1 | 3/2010 | Tsai |
| 2010/0241837 | A1 | 9/2010 | Concorso |

(Continued)

OTHER PUBLICATIONS

Elinux.org, "RPi U-Boot," *Embedded Linux Wiki*, Dec. 2, 2012, web Feb. 18, 2014, <http://elinux.org/index.php?title=RPi_U-boot &oldid=197048&print>.

(Continued)

*Primary Examiner* — Mohammed Rehman
*Assistant Examiner* — Gayathri Sampath
(74) *Attorney, Agent, or Firm* — W. Eric Webostad

(57) ABSTRACT

A system generally relating to an SoC, which may be a field programmable SoC ("FPSoC"), is disclosed. In this SoC, dedicated hardware includes a processing unit, a first internal memory, a second internal memory, an authentication engine, and a decryption engine. A storage device is coupled to the SoC. The storage device has access to a boot image. The first internal memory has boot code stored therein. The boot code is for a secure boot of the SoC. The boot code is configured to cause the processing unit to control the secure boot.

15 Claims, 15 Drawing Sheets

(56) References Cited

U.S. PATENT DOCUMENTS

| | | |
|---|---|---|
| 2011/0258426 A1* | 10/2011 | Mujtaba et al. ......... G06F 21/57 713/2 |
| 2011/0265183 A1 | 10/2011 | Wu et al. |
| 2012/0060039 A1* | 3/2012 | Leclercq ..................... 713/189 |
| 2012/0210115 A1 | 8/2012 | Park et al. |
| 2013/0042098 A1 | 2/2013 | Baik et al. |
| 2013/0185563 A1 | 7/2013 | Djabarov et al. |

OTHER PUBLICATIONS

U.S. Appl. No. 14/019,323, filed Sep. 5, 2013, Sanders et al.
U.S. Appl. No. 13/833,177, filed Mar. 15, 2013, Sanders et al.
U.S. Appl. No. 13/833,371, filed Mar. 15, 2013, Kochar.
Xilinx, Inc., *Zynq-7000 All Programmable SoC Software Developers Guide*, UG821 (v3.0), Oct. 16, 2012, pp. 1-42, Xilinx, Inc., San Jose, California, USA.
Xilinx, Inc., *Zynq-7000 All Programmable SoC Technical Reference Manual*, UG585 (v1.4), Nov. 16, 2012, Chapters 6, 27, 28, 32 (76 pages), Xilinx, Inc., San Jose, California, USA.
Huang, Andrew, "Keeping Secrets in Hardware: the Microsoft Xbox Case Study," AI Memo 2002-008, May 26, 2001, pp. 1-15, Massachusetts Institute of Technology, Artificial Intelligence Lab, Cambridge, Massachusetts, USA.

\* cited by examiner

500

| Boot ROM Header |
| 501 |
| Reserved Space |
| 510 |
| Partition Header Table |
| 502 |
| FSBL Partition |
| 503 |
| Bitstream Partition |
| 504 |
| u-Boot Partition |
| 505 |
| Linux zImage Partition |
| 506 |
| Linux Device Tree Partition |
| 507 |
| Linux Disk Image Partition |
| 508 |
| Unused Space |
| 511 |

| Reserved for Interrupts |
| 562 |
| Width Detection |
| 563 |
| Image Identification |
| 564 |
| Encryption Status |
| 565 |
| User Defined |
| 566 |
| Source Offset |
| 567 |
| Length of Image |
| 568 |
| Start of Execution |
| 569 |
| Total Image Length |
| 570 |
| Header Checksum |
| 571 |
| Register Initialization |
| 572 |
| FSBL Image |
| 573 |

FIG. 5-5

SECURED BOOTING OF A FIELD PROGRAMMABLE SYSTEM-ON-CHIP INCLUDING AUTHENTICATION OF A FIRST STAGE BOOT LOADER TO MITIGATE AGAINST DIFFERENTIAL POWER ANALYSIS

TECHNICAL FIELD

The following description relates to integrated circuit devices ("ICs"). More particularly, the following description relates to system-on-chip boot, during boot, and post-boot security of an IC.

BACKGROUND

The availability of increasingly powerful systems-on-chips ("SoCs") has led to growth of embedded computing. Embedded devices, popular because they facilitate mobility, are more vulnerable than enterprise devices. With the increased capability of embedded devices, the value of the information in such embedded systems has grown, and so too has the need to protect such information. Threats to embedded devices include device loss/theft, data loss/theft, cloning, reverse engineering, and denial of service.

For example, an end user, who might own only a single embedded device, is most affected by loss or theft of the device. End users may also be concerned with privacy and integrity of information stored in embedded devices. A manufacturer of an embedded system, or a software vendor that produces applications for embedded devices, may be concerned whether their source code can be stolen. If the adversary cannot steal such code, the embedded device may still be cloned by stealing the object code. An adversary can steal compiled code when an embedded device is booted (i.e., powered on) or running by inserting malware when images are initially loaded into an SoC. As an example attack, inserted malware can write loaded object code to an external port for capture to clone the embedded device. Furthermore, for example, in a denial of service attack, malware can cause an embedded device to become inoperable or unavailable.

Thus, generally two security-related tasks in embedded devices are secure boot and maintaining security during device operation. With respect to the former security-related task, it would be useful to provide security for an embedded device in order to protect against one or more of the above-mentioned threats.

SUMMARY

A system generally relates to a system-on-chip ("SoC"), which may be a field programmable SoC ("FPSoC"), having dedicated hardware including a processing unit, a first internal memory, a second internal memory, an authentication engine, and a decryption engine. A storage device is coupled to the SoC. The storage device has access to a boot image. The first internal memory has boot code stored therein. The boot code is for a secure boot of the SoC. The boot code is configured to cause the processing unit to control the secure boot.

A method generally relates to booting an SoC, which may be a field programmable SoC ("FPSoC"). A boot code stored in the SoC is accessed under control of a processing unit of the SoC for the secure boot mode. The boot code is executed under control of the processing unit. The boot code is stored in nonvolatile memory of the SoC. The executing of the boot code includes: accessing the nonvolatile memory of the SoC to obtain boot information; determining validity of the boot information; if the boot information is determined to be valid, accessing a storage device coupled to the SoC having a boot image; loading a boot header of the boot image; and validating the boot header of the boot image.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 5-1 is a block diagram depicting an exemplary image output with multiple partitions.

FIG. 5-2 is a block diagram depicting an exemplary boot image format.

FIG. 5-3 is a block diagram depicting another exemplary boot image format.

FIG. 5-4 is a block diagram depicting yet another exemplary boot image format for a secure boot image with a breakout of an image.

FIG. 5-5 is a block diagram depicting an exemplary boot header format.

FIGS. 6-1 and 6-2 ("FIG. 6") is a flow diagram depicting an exemplary boot ROM code flow.

FIG. 7-1 is a block diagram depicting an exemplary cascade mode.

FIG. 7-2 is a block diagram depicting an exemplary independent mode.

DETAILED DESCRIPTION

Figure 1:
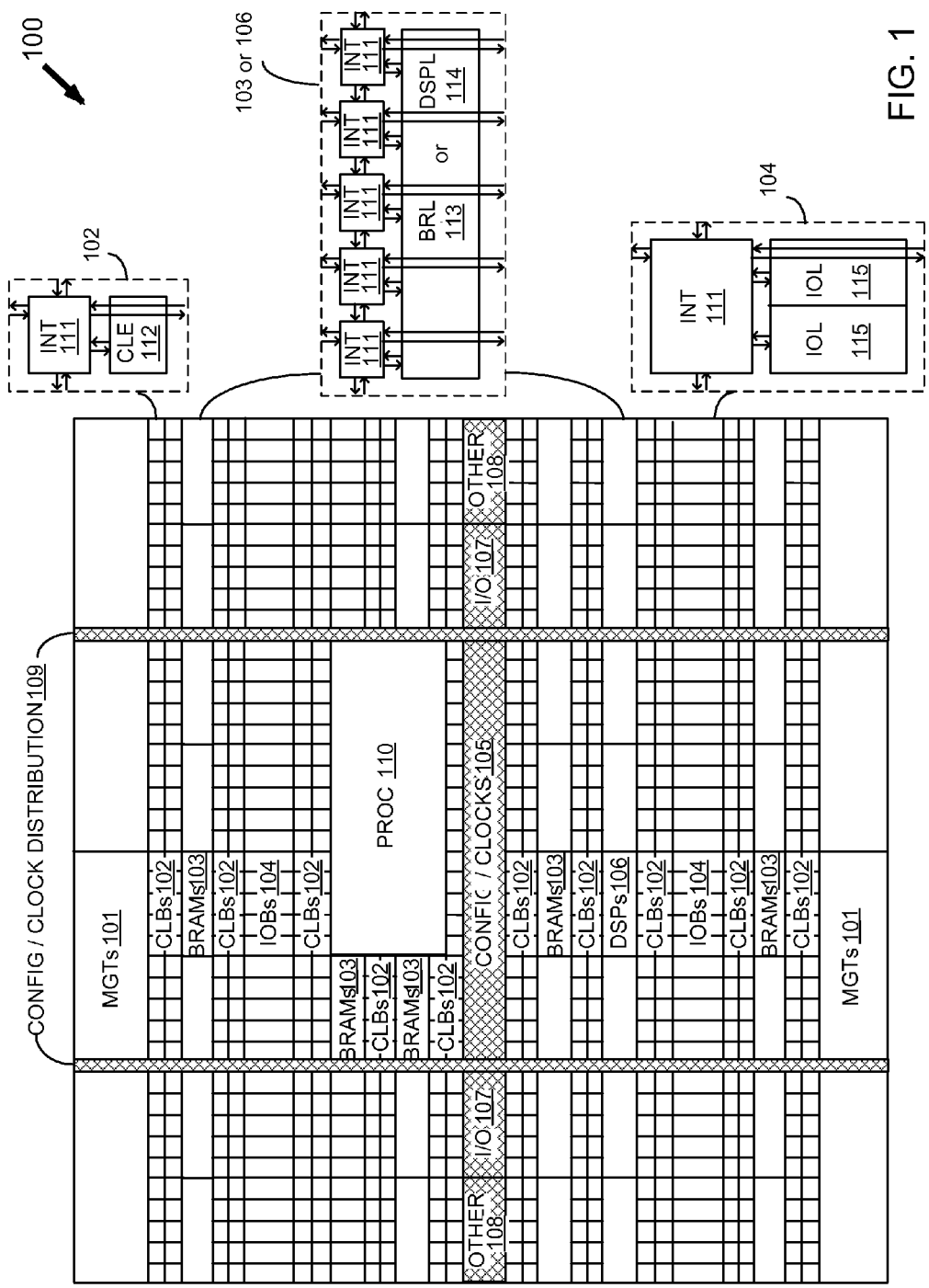
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Furthermore, though particular numerical examples, such as numbers of bytes for example, are described herein for purposes of clarity by way of example, it should be understood that the scope of the description is not limited to these particular numerical examples as other values may be used.

Additionally, even though specific algorithms for encryption, decryption, and authentication have been described herein, it should be understood that these or other algorithms may be used in accordance with the description herein.

In the following description, for purposes of explanation, specific nomenclature is set forth to provide a thorough understanding of the various inventive concepts disclosed herein. However, it will be apparent to one skilled in the art that these specific details are not required in order to practice the various concepts disclosed herein.

Some portions of the detailed descriptions that follow are presented in terms of algorithms and symbolic representations of operations on data bits or bytes within a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of electrical, optical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Before describing the examples illustratively depicted in the several figures, a general introduction is provided to further understanding.

A secure boot of an SoC, such as an SoC with programmable resources, is described below. Programmable resources may be those for example of an FPGA. For purposes of clarity, an SoC with programmable resources, including without limitation field programmable or configurable logic, field reprogrammable or reconfigurable logic, and/or configurable logic arrays or other programmable logic arrays, as well as any other programmable resources, is referred to hereinafter as a field programmable SoC ("FPSoC"). An example of an FPSoC is an combination of an SoC and an FPGA ("SoC-FPGA"); however, any SoC having programmable fabric may be considered an FPSoC. Such secure boot includes an initial authentication of an image before loading into such FPSoC. Furthermore, a default state of boot is a secure state of an FPSoC, which may involve locking control registers to lock boot subsystems. Additionally, preauthenticating with a short bootloader image using a hardware-based decryptor may be used to subsequently instantiate a programmable resources-based decryptor, which is more intrinsically resistant to a side channel attack than such hardware-based decryptor.

With the above general understanding borne in mind, various embodiments for booting an FPSoC securely and maintaining security thereof after such a secure boot are generally described below.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
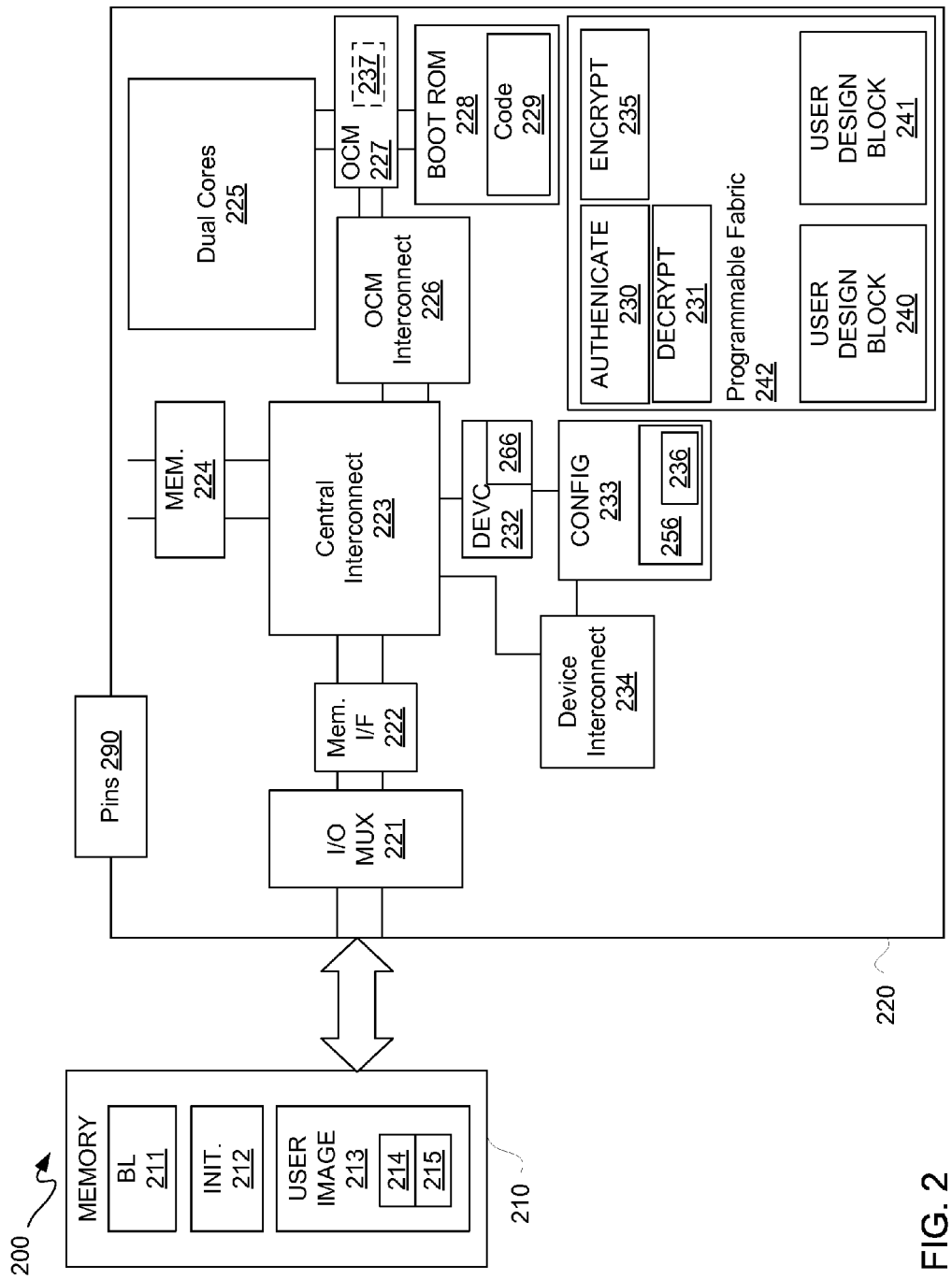
FIG. 2 is a block diagram depicting an exemplary field programmable system-on-chip ("FPSoC") system.

FIG. 2 is a block diagram depicting an exemplary field programmable system-on-chip ("FPSoC") system 200. FPSoC system 200 includes an FPSoC 220 chip or die coupled to an external memory 210 chip or die. External memory 210 may be packaged together with FPSoC system 200, such as in a stacked die configuration, which may or may not include an interposer die. External memory 210 may be nonvolatile memory ("NVM") or battery backed volatile memory. For purposes of clarity by way of example and not limitation, it shall be assumed that memory 210 is a flash memory; however, other types of memory may be used.

Memory ("NVM") 210 may be used to store boot image including a bootloader 211, a programmable resources ("PR") initialization image 212, and a user image 213. User image 213 may include a processing system software or hardware image 214 and/or programmable resources configuration information image 215. For purposes of clarity by way of example and not limitation, it shall be assumed that bootloader 211 is a first stage bootloader ("FSBL") 211. A boot image stored in NVM 210 may include encrypted or enciphered information and/or clear text, namely information which is not ciphered or encrypted. For example, FSBL 211 and/or user image 213 may or may not be in encrypted form, namely "ciphertext," and programmable resources configuration information 215 may be plain form, namely "plaintext."

FPSoC 220 may be an "all programmable" ("AP") FPSoC, namely a processor-centric platform that offers software, hardware and I/O programmability in a single chip. FPSoC 220 may include a single core processor or a multicore processor, such as for example dual cores 225, generally singly and collectively referred to as a "central processing unit" or CPU or processing unit, and programmable resources, including without limitation programmable fabric 242. There may be hard blocks or hard macros ("hardware" or "hardware-based") in AP FPSoC 220, as well as soft blocks or soft macros instantiated in programmable fabric 242. FPSoC 220, as an processor-centric chip, may be used to facilitate a processor to boot first, while a software-centric approach may be used to control configuration/reconfiguration, including without limitation partial reconfiguration, of programmable fabric 242, such as for example to improve system performance and power management to adjust to different operating environments.

Along the lines of soft blocks, user design blocks 240 and 241 for example may be instantiated in programmable fabric 242. Additionally, an authentication block ("authenticator") 230, a decryption block ("decryptor") 231, and an encryption block ("encryptor") 235 may be instantiated in programmable fabric 242. One or more of these instantiated blocks may be more robust with respect to repelling a side channel attack than dedicated hardware for these operations, as described below in additional detail. For purposes of clarity and not limitation, it shall be assumed that encryptor 235 is configured for Advanced Encryption Standard ("AES") with key rolling; however, other types of encryption with or without key rolling or other key handling technology may be used.

As for hard blocks, in addition to dual cores 225, AP FPSoC 220 may include random access memory ("RAM") 224, such as BRAM or other RAM, an I/O multiplexer ("MIO") 221, a memory interface ("I/F"), such as for example a flash memory I/F 222, a central interconnect 223, an on-chip random access memory ("OCM") interconnect 226, OCM 227, boot read-only memory ("ROM") 228, a device configuration interface block ("DevC") 232, a configuration block 233, and a device interconnect 234. Device interconnect 234 may be for interconnecting peripheral devices for example. DevC 232 may include lockable configuration registers 266; however, one or more other lockable configuration registers 266 may exist elsewhere in FPSoC 220, in accordance with the following description, though not shown for purposes of clarity and not limitation. For purposes of clarity by way of example and not limitation, it shall be assumed that peripheral interconnect 234 is an AXI interconnect and dual cores 225 are ARM Cortex cores; however, this or another processor system may be used. Additionally, for purposes of clarity by way of example and not limitation, it shall be assumed that configuration block 233 is for AES/SHA ("Secure Hash Algorithm"), and has a hard coded key 236 therefor. Key 236 may be stored in on-chip battery-backed RAM ("BBRAM") or nonvolatile memory elements, including without limitation one-time programmable ("OTP") elements, 256 of FPSoC 220.

Boot ROM 228 may include boot ROM code or boot code 229, such as described below in additional detail. Boot code 229 has access to such key 236. For example, key 236 may be unchangeable once programmed and stored in hardware (e.g., masked ROM code, eFuse array, or other nonvolatile memory elements). Key 236 may for example be an AES key, and such key may be stored in plaintext. Another key 237, such as an AES key for example, may be transferred from FSBL 211 to PR initialization block 212 for temporary storage in OCM 227. Key 237 may be stored in plaintext. Additionally, pins 290, which may include bootstrap pins, may be used by boot ROM 228. FPSoC 220 may for example be coupled to a printed circuit board ("PCB") or other circuit board.

Figure 3:
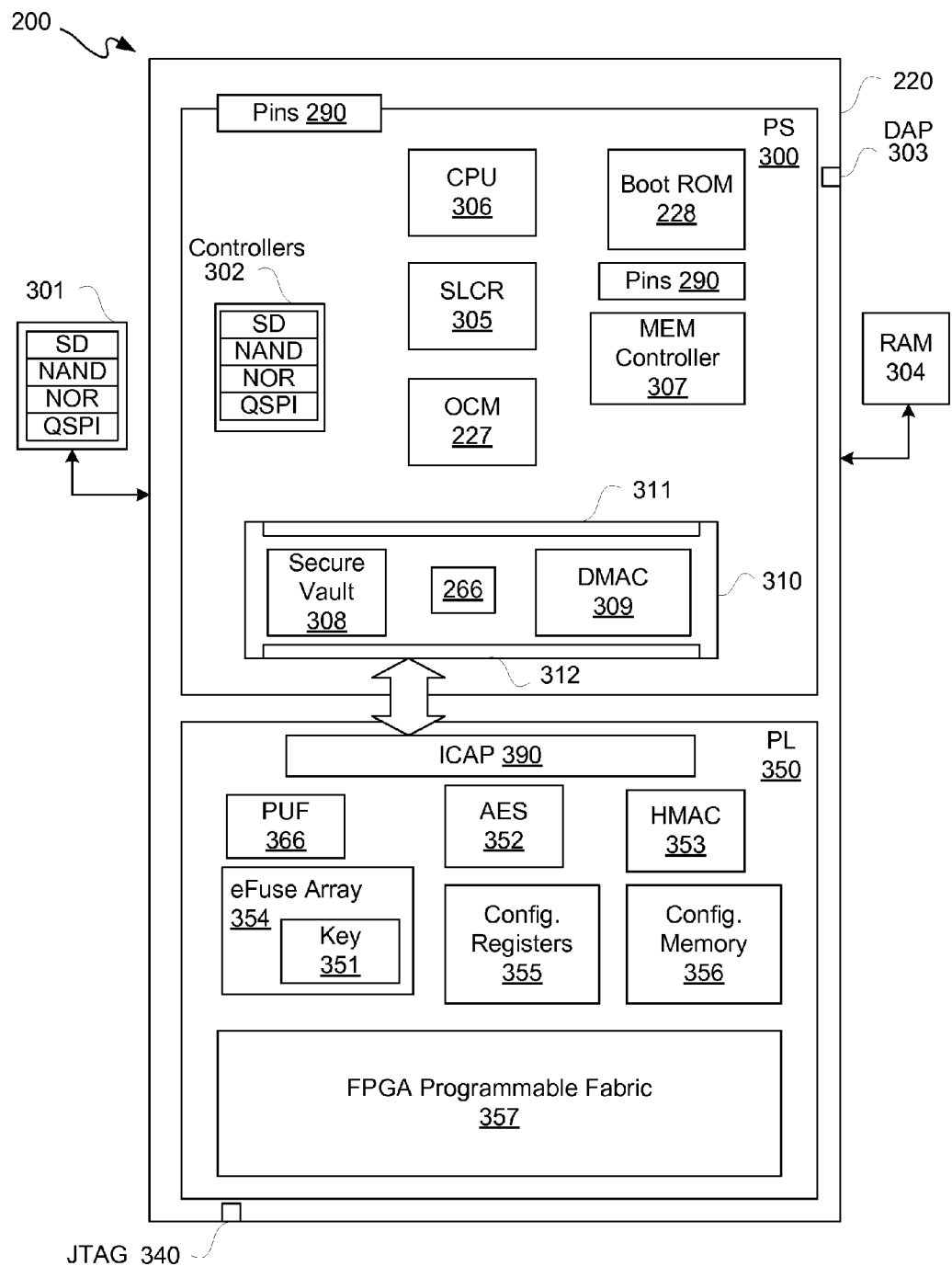
FIG. 3 is a block diagram depicting another example of an FPSoC system.

FIG. 3 is a block diagram depicting another example of FPSoC system 200. FPSoC system 200 of FIG. 3 illustratively depicts hardware components used in a boot process. Along those lines, a secure boot for FPSoC system 200, and particularly FPSoC 220, may extend immediately from power-on until one or more applications are running, such as one or more applications ("apps") running on an embedded device for example. By booting up in a secure state, a secure "root of trust" may be established by such secure boot. Thus, for example, a secure boot may be a default boot state for FPSoC 220.

FPSoC 220 is generally parsed into a processing system portion ("PS") 300 and a programmable logic portion ("PL") 350. PS 300 may include NVM controllers 302, memory controller 307, a boot ROM 228 which for example may be masked programmed, OCM 227, central processing unit ("CPU") or application processing unit ("APU") 306, system-level control register ("SLCR") block 305, and DevC 310. DevC 310 may include a secure vault or secure policy block 308 and a direct memory access controller or engine ("DMAC") 309, an on-chip bus or interface 311 and a processor configuration access port ("PCAP") or interface 312. For purposes of clarity by way of example and not limitation, it shall be assumed that on-chip bus 311 is an AXI interface; however, other types of on-chip busses may be used. Along those lines, DevC 310 may include an AXI-to-PCAP bridge that uses an AXI master and DMAC 309 to bridge PCAP 312 and AXI interface 311, and AXI interface 311 may include an Advanced Peripheral Bus ("APB") interface. Additionally, DevC 310 may include an analog-to-digital converter interface.

FPSoC 220 may be coupled to any of one or more of a variety of types of NVMs 301, including without limitation secure digital ("SD") flash memory, NAND flash memory, NOR flash memory, and/or QSPI flash memory. Even though SD flash memory may be a type of NAND flash memory, there may be differences between generic NAND flash and SD NAND flash memories, and thus they may be separately identified below. Furthermore, FPSoC 220 may be coupled to external RAM 304, such as for example a double-data-rate ("DDR") DRAM or other RAM. Again, such RAM 304 may be part of a stacked die with FPSoC 220 or a separate chip on a PCB for example. Furthermore, FPSoC 220 may have a JTAG subsystem 340 and a debug access port ("DAP") subsystem (i.e., DAP controller, DAP access port ('AP'), etc.) 303. Optionally, FSBL 211 may be downloaded through JTAG subsystem (i.e., TAP controller, JTAG port, etc.) 340 though not as part of a secure boot.

PL 350 may include an array of electrically one-time programmable ("OTP") or other nonvolatile memory elements (e.g., "eFuses") 354 having programmed therein a public key 351 stored among eFuses of eFuse array 354, an internal configuration access port ("ICAP") 390, a hardware-based authentication engine 352, such as an AES engine for example, a hardware-based authentication code engine 353, such as a hash-based message authentication code ("HMAC") engine for example, configuration registers 355, and configuration memory 356, as well as FPGA programmable fabric 357. There may be an internal interface or communication bridge for communication between ICAP 390 and PCAP 312. Optionally, PL 350 may include a Physically Unclonable Function ("PUF") or PUF key generator 366.

NVM 301, which may be used to store C, hardware design language ("HDL") code, or high-level synthesis ("HLS") object code, such as ANSI C, C++, or SystemC for example, may be any one of SD, NAND, NOR, or QSPI flash memory. DevC block 310 through DMAC 309 for example may be used to move PS 300 and PL 350 images containing design or other configuration information.

Hereinafter, FPSoC systems 200 of FIGS. 2 and 3 are used interchangeably.

Boot ROM 228 may contain code to be run by CPU 306. CPU 306 may run an initial boot code 229 at power-up. AES engine 352 and HMAC engine 353 may be used to ensure that images maintain confidentiality, integrity, and authenticity. A public key 351, such as an RSA public key, may be used to employ an RSA algorithm to authenticate images. OCM 227 may be used to provide secure storage of FSBL 211. OTP elements of eFuse array 354 may be used to store a decryption key and to define device control parameters.

After boot, PL 350 may be powered down for low power operation. Partial reconfiguration can be used to reduce power consumption. PS 300 may be programmed using C or other well-known software programming language, and PL may be programmed using an HDL, such as Verilog and/or VHDL. Moreover, an HLS tool that synthesizes C/C++, SystemC, and/or System Verilog code to an HDL may be used. C/C++, SystemC, and/or System Verilog can be used by software engineers to define user designs in PL 350. Such HDL may be converted to configuration information, such as a configuration bitstream, in a well-known manner. Along those lines, configuration information may be stored in NVM, as described herein.

In addition to a high level of integration in PS 300, FPSoC 220 may provide support for secure boot, secure storage, RSA authentication, AES decryption, and/or HMAC authentication. Asymmetric RSA and/or symmetric AES/HMAC algorithms may be used.

Figure 4:
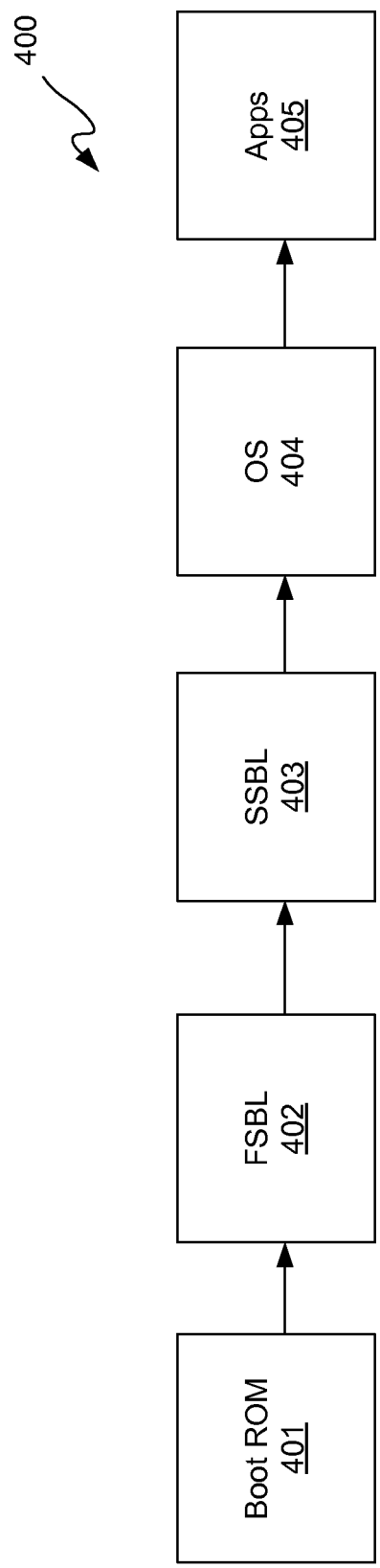
FIG. 4 is a flow diagram depicting an exemplary secure boot flow for the FPSoC system of FIG. 2 or 3.

FIG. 4 is a flow diagram depicting an exemplary secure boot flow 400 for FPSoC system 200. Accordingly, secure boot flow 400 is further described with simultaneous reference to FIGS. 2 through 4.

CPU 306 may be used to control a boot process by writing to DevC 311 registers, such as of secure vault 308. Security-related registers of secure vault 308 may include redundancy for fault tolerant and failsafe operation. Such redundant registers may include registers that select a configuration port, a decryptor, a key source, an operation mode, and/or a security mode, among other things.

Security for FPSoC 220 may be provided by locking access to boot subsystems when such boot subsystems are not being used in an authorized boot operation. Along those lines, hardware resources, including boot ROM 228 settings, may be used to auto-lock boot subsystems at power-up. Control registers, such as of SLCR block 305, may be used to allow CPU 306 to lock boot subsystems. Locking access to boot subsystems increases FPSoC 220 security by preventing unauthorized loading of images into FPSoC 220. Along the above lines, one or more of the following may be provided depending whether a security violation is detected, and if detected where detected, during a secure or non-secure boot: unlocking/locking SLCR 305, unlocking/locking DevC 311 configuration including unlocking/locking DMAC 309, unlocking/locking eFuses 354, unlocking/locking configuration interfaces, isolating PS 300 and PL 350 subsystems, unlocking/locking decryption-authentication circuitry, not allowing/allowing key swap in a multi-boot mode, and not allowing/allowing boot mode changes in a multi-boot mode. Additionally, separate PS 300 and PL 350 JTAG chains may be configurable as independent or concatenated, with multiple lock mechanisms. However, if a JTAG boot mode is selected, then device configuration registers generally cannot be locked in such a way as to perform a secure boot. Most of these functions are available during operation of FPSoC 220 and not just at boot thereof.

Authorized images may be loaded as part of a secure boot to configure PS 300 and PL 350. To boot, FPSoC 220, CPU 306, acting as a master, may use OCM 227, DMAC 309, AES engine 352, HMAC engine 353, and other boot subsystems to have FPSoC system 200 self-load images for configuration. Access control to these boot subsystems is provided, as described below in additional detail. Heretofore, embedded devices which contain processors and programmable logic were produced where a boot mechanism used a dedicated configuration controller rather than FPSoC 220. In contrast, CPU 306 in PS 300 is used to self-configure FPSoC system 200.

Having a self-configuring FPSoC 220, where such configuration is controlled by an internal CPU 306, provides several advantages. Along those lines, processor-based configuration is generally more familiar to FPSoC software developers than a hardware-based configuration controller conventionally used in configuration of FPGAs. Using CPU 306 to configure FPSoC 220 facilitates software updates, as a conventional image load procedure, or a more secure image load procedure as described herein, may be used for such software updates.

Integration of a large number of peripherals, including without limitation Ethernet and PCIe controllers, provides security against attacks. Not only are FPSoC 220 integrated peripherals difficult to access by an attacker, resistance to attacks may be more manageable because such peripheral controllers are within a security perimeter of FPSoC 220. Moreover, FSBL 211 boot code may be used to invoke peripherals, such as for example Ethernet, USB, SDIO, and/or PCIe, among others.

For FPSoC 220 to be secure at power-up, multiple boot phases or stages 401 through 405 for a secure boot are used. For a secure boot, generally each boot stage hands off boot responsibility to the next successive boot stage, provided, however there no security violation occurs during a current boot stage.

In secure boot flow 400, successive boot stages 401 through 405 may be used to load images for PS 300 and PL 350. At 401, boot ROM 228 boot code 229 is used to start a secure boot at power-up, namely to establish a "root of trust." For this initial boot stage, CPU 306 of PS 300 executes such boot code 229 at 401 to load a FSBL 211 and to transfer control to such FSBL 211. FBSL 211 may be loaded to OCM 227. This transfer of control to FSBL 211 may be done without introducing malware or a back door. In other words, boot ROM code 229 hands off to FSBL 211 in a secure state. This security may be provided by authentication and/or decryption.

At 402, FSBL 211 loads subsequent images, which can include a secondary stage bootloader ("SSBL") at 403 such as a u-Boot or U-Boot for example, an operating system ("OS") at 404 such as Linux for example, and application code and/or configuration formation (e.g., a configuration bitstream) for PL 350 at 405. These or other types of images may be used.

FSBL 211 and each subsequent bootloader may maintain a chain of trust stemming from such root of trust; however, a user may set such boot process at any stage after an initial boot. In other words, a user of FPSoC 220 may configure FSBL 211 and each subsequent bootloader stage for control of all boot phases after an initial boot at 401, as described below in additional detail. A chain of trust may include configuration of programmable resources of FPSoC 220.

For purposes of clarity by way of example and not limitation, an FSBL 211 and/or one or more SSBLs may move images from one memory location, such as in NVM 301, into another memory location, such as in RAM 304. Thus, for example, at 402, FSBL 211 may load an SSBL from NVM 301 into RAM 304. At 403, such an SSBL may move an OS from NVM 301 to RAM 304. Such an OS may be Linux, Android, iOS, or another OS such as for example VxWorks, Integrity, or PikeOS, or any other OS. Such image load operation may be repeated for systems using two or more cores of CPU 306. After OS(s) are loaded at 404, applications may be loaded at 405.

To recapitulate, an FPSoC, such as for example an SoC-FPGA, which may use RSA code signing for public key authentication, AES encryption, and HMAC private key authentication on a per image basis has been described. In such an FPSoC, a boot process is controlled by a CPU 306 thereof. For an FPSoC to boot, a CPU 306 self-loads images for configuration of PS 300 and PL 350. These images are loaded using code in an on-chip boot loader, which may run from boot ROM and one or more subsequent boot loaders. Dedicated circuitry of such FPSoC 220 may be used to provide user selectable authentication, confidentiality, and integrity on each image loaded. On a per image basis, this circuitry can provide RSA code signing and/or AES decryption/HMAC authentication. Additionally, hardware of such FPSoC provides auto-activation/deactivation of security hardware based on user selections in a boot mode and boot header in a partition data table. Additionally, libraries for RSA public key code verification may be used to allow a public key code verification option to be put in either an FSBL or an SSBL. An example of an SSBL is known as a Universal Bootloader or U-Boot.

An FSBL may be loaded into OCM, where such FSBL has RSA code. From a secure boot, a root of trust may be established from which a chain of trust may be created or maintained, such as within a boot image or other image for example.

Images may be loaded at boot time or sometime later after a boot of FPSoC 220. Along those lines, any of the following post boot activities may be conducted: authentication and/or encryption of software updates in a fielded device, authentication and/or encryption of full or partial bitstream in a fielded device, and/or loading of authenticated and/or encrypted data files in a fielded device.

Figures 1, 5:
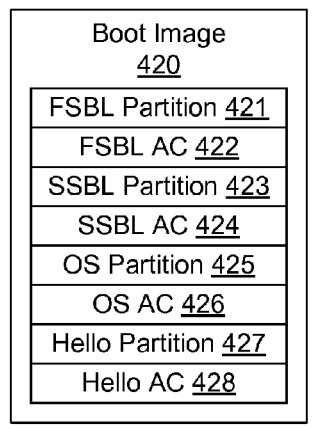
Figures 2, 5:
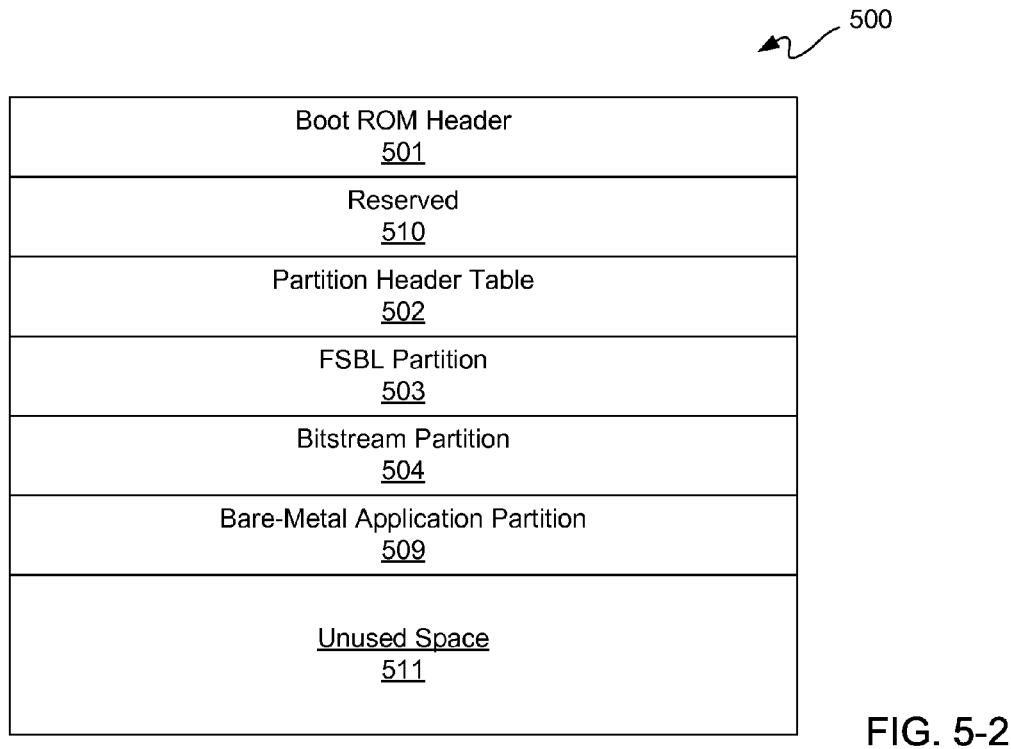
Figures 4, 5:
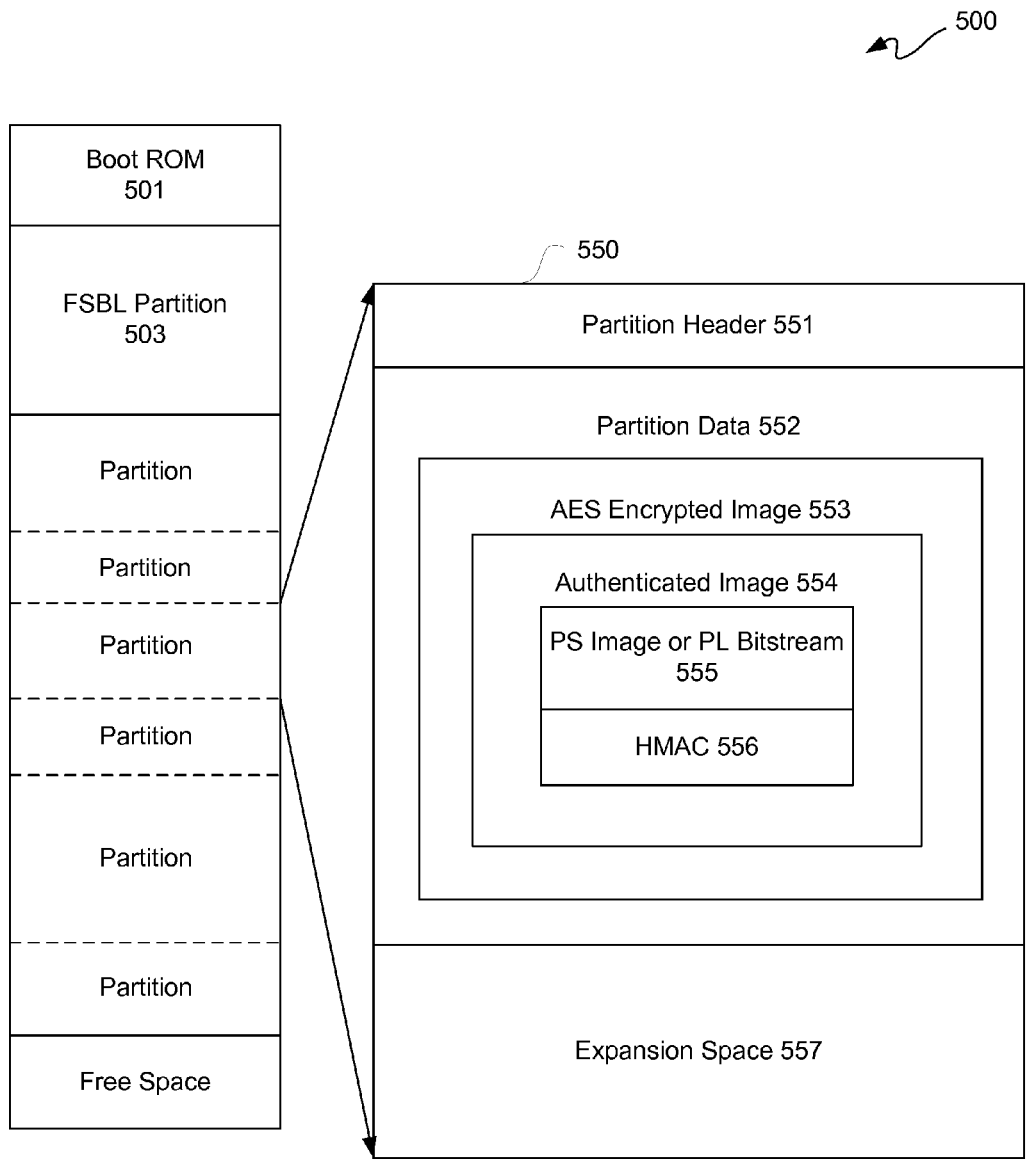

FIG. 5-1 is a block diagram depicting an exemplary image output ("image") 420 with multiple partitions. Image 420 may be provided as a single file, which may have multiple partitions. Image 420 may be a binary or MCS file in which all partitions (e.g., for bootloaders, OS, bit files, etc.) are unencrypted or encrypted.

For purposes of clarity by way of example and not limitation, image 420 is illustratively depicted as having an FSBL partition 421, a second stage bootloader ("SSBL") partition 423, an OS partition 425, and a "Hello" or "Hello World" application partition 427. However, these or other partitions, such as other SSBL partitions, configuration bitstream partitions, and/or more application partitions for example, may be used.

Because authentication has an RSA attribute setting which may be specified for each partition, image 420 may contain an authentication certificate ("AC") for each partition. Along those lines, by having an AC for each partition, a chain of trust may be established within an image 420. FSBL partition 421, as well as each bitstream partition and each Hello partition may be encrypted and signed for purposes of authentication. Each SSBL partition, such as for example u-Boot partition, 423, and each OS partition, such as Linux partition, 425 for example, may be signed for purposes of authentication and not be encrypted, as these are open source items.

An AC, such as an RSA Authentication Certificate for example, contains an authentication header field which defines parameters, such as for example the version of an authentication certificate, a public key cryptography used (e.g., RSA-2048, ECC, etc.), encryption used (e.g., AES-CBC, AES-GCM, etc.), and size (e.g., SHA size, etc.), among other parameters. To load file 430 into NVM, flash memory may be programmed or image 420 may be copied for example onto an SD card for insertion into an SD slot. NVM may be written with known tools therefor.

Generation of image 420 may be performed at a production facility. A production facility may have an isolated key management facility with restricted access. Moving partition(s) of image 420 from NVM into executable regions of FPSoC 220 may be done by code executed in the field, as described below in additional detail. Generally, at power up, FPSoC 220 runs one or more boot loaders to move partitions from NVM to locations, such as for example addresses in memory which may or may not be specified in image 420, where code may be executed. For example, software partitions may be moved to DDR RAM or on-chip RAM. PL code, such as configuration information, may be moved to PL configuration memory. For this example, boot loaders that may be used in FPSoC include a bootloader in boot ROM, FSBL, u-Boot, and Linux.

In addition to moving image 420, an image loader reads each AC to determine if a partition associated therewith is signed and/or encrypted, and then authenticates and/or decrypts each partition as appropriate. In the example of image output 420, there is an FSBL AC 422, an SSBL AC 424, an OS AC 426, and a Hello World AC 428.

Loading an image into FPSoC 220 may thus involve reading an image to load all partitions. For each partition loaded, it may be determined if such partition is signed. If a partition is signed, authentication of such partition may be verified. If such partition is verified to be authentic, then it may be determined whether such partition is encrypted. If such partition is encrypted, then this partition may be decrypted. Once a partition is available in plaintext, whether or not from decryption, such partition may be moved to its destination, assuming such partition was authenticated if signed. Such processing of partitions may be repeated for each partition. Generally, for purposes of clarity and not limitation, this process is described more broadly on an image basis rather than on a partition-by-partition AC basis.

FIG. 5-2 is a block diagram depicting an exemplary boot image format 500. Boot image format 500 includes a boot ROM header 501, a partition header table 502, an FSBL partition 503, a bitstream partition 504, and a bare-metal application partition 509. Bitstream partition 504 may include configuration information for PL 350, which is optional as PS 300 may be operational without PL 350. Furthermore, there may be reserved space 510 and unused space 511, if available. Thus, generally, a boot image format 500 may include a boot ROM header, a FSBL image, and one or more partition images.

FIG. 5-3 is a block diagram depicting another exemplary boot image format 500. Boot image format 500 is for an SSBL being a u-Boot and for an OS being Linux; however, other SSBLs and/or other OSs may be used. Boot image format 500 includes boot ROM header 501, partition header table 502, FSBL partition 503, bitstream partition 504, u-Boot partition 505, Linux zImage partition 506, Linux device tree partition 507, and Linux disk image partition 508. Furthermore, there may be reserved space 510 and unused space 511, if available.

FIG. 5-4 is a block diagram depicting another exemplary boot image format 500 for a secure boot image with a breakout of an image 550. Boot image format includes a boot ROM header 501 and an FSBL partition 503, followed by any number, including zero, of succeeding partitions. Boot ROM header 501 identifies a boot image as secure or non-secure at an offset address. A value stored in boot ROM header 501 at such offset address determines a key source, such as for example a first value for an encrypted image using an eFuse key, a second value for an encrypted image using a battery-backed BRAM ("BBRAM") key, and all other values are for a non-encrypted image.

Image 550 may include a partition header 551, partition data 552, and optionally expansion space 557. Partition data may include an unencrypted image or an encrypted image 553. Encrypted image 553 may be an AES encrypted image. Encrypted image 553 may include an authenticated image 554. Authenticated image 554 may include a PS image and/or a PL image 555 and an authentication code 556, such as for example an HMAC 556.

Boot ROM header 501 and partition headers, such as partition header 551 for example, are not encrypted. However, partition data 552 may be signed and encrypted for subsequent decryption by AES engine 352 and authentication by HMAC engine 353 for example. If boot image format uses encryption, then all data partitions in a boot image 500 may be encrypted such that there is not a mix of encrypted and non-encrypted data partitions in a boot image. Thus, for example, all subsequent PS images, PL configuration bitstreams, and PL partial reconfiguration bitstreams, whether loaded by PCAP or ICAP (i.e., an internal configuration access port), may be encrypted if a preceding FSBL is encrypted. In an example, there is no mechanism to move from a non-secure state to a secure state, aside from a POR, and any attempt to load encrypted data after unencrypted data results in security violation and security lockdown.

FIG. 5-5 is a block diagram depicting an exemplary boot header ("BH") format 560. BH format may include fields. Such fields may include a reserved for interrupts field 562, a width detection field 563, an image identification field 564, an encryption status field 565, a user defined field 566, a source offset field 567, a length of image field 568, a start of execution field 569, a total image length field 570, a header checksum field 571, a register initialization field 572, an FSBL image field 573, and optionally one or more other reserved fields not shown.

Security of an embedded device may depend on the ability of such an embedded device to detect a problem, such as a modified boot header for example, and the ability of such embedded device to take effective action when a problem is detected.

After a problem is detected, boot ROM code 229 shuts down PL 350, clears content of both PS 300 and PL 350 memory and registers, and enters a secure lock-down state. The only way to exit such a secure lock-down state may be to cycle power to FPSoC 220 or activate a power-on reset pin thereof.

In an initial boot process, boot ROM code 229 may run tests on an FSBL image 211. If any test fails, boot ROM 228 may transition FPSoC 220 into a secure lock-down state. If all tests pass, CPU 306 may activate access to a boot subsystem used in a next boot task, executes such task, and then disables access to such boot subsystem.

Boot ROM code 229 may execute off of a mask programmed boot ROM, which is generally not readable or modifiable. Along those lines, only external inputs affecting boot ROM 228 operation may be boot mode pins and an encryption mode specified in boot header. NVM 301 used in a boot, such as for example QSPI, NAND, NOR, or SD flash memory, may be selected by external boot mode pins.

Prior to FPSoC 220 powering-up, NVM 301 may be loaded with a boot image 500. Boot image 500 may include BH, FSBL, SSBL, OS, application(s), and/or PL bitstream images, as previously described. At power-up, boot ROM code 229 may read a BH in NVM 301, where such BH may have image identification, encryption, length, location, and checksum fields for example. In such BH, an encryption field may indicate if FSBL 211 is encrypted, and if it is encrypted, such encryption field may indicate whether a key source is stored, such as in on-chip BBRAM or an on-chip eFuse array for example. Boot ROM code 229 validates a BH by testing an image identification and BH checksum fields. For example, if specified in an eFuse array 354, boot ROM code 229 may perform a public key RSA authentication of FSBL 211. If such image is encrypted, this image may be routed to AES engine 352 for decryption and then to HMAC engine 353 for authentication.

Watchdog timers may be used to ensure that reset, initialization, and phase-locked loop ("PLL") operations start up and run as expected. Boot ROM code 229 may verify that there is not a discrepancy between parameters specified in eFuse array 354 and a BH. Boot ROM code 229 may verify that a boot mode is authorized for a set of parameters specified. For example, if a BH specifies an execute-in-place ("XIP") operation and a secure boot, FPSoC 220 may transition into a secure lock-down.

Because FPSoC 220 is reprogrammable, it may be vulnerable to adversaries changing a code loaded. However, by providing locking mechanisms which prohibit access to boot subsystems from unauthorized users, these vulnerabilities may be substantially abated. In some instances, access may be limited by auto-locking of boot subsystems. For example, for all bootloaders, CPU 306 can control access to boot subsystems by writing to lock control registers. Conventional embedded devices did not use a processor as a master of a boot process, and such conventional embedded devices did not provide an ability to lock access to boot subsystems when not in use.

To recapitulate, FPSoC 220 provides access control mechanisms used by an initial bootloader. Boot subsystems may be locked by CPU 306 include a device configuration interface 310, including DMAC 309, AES engine 352, HMAC engine 353, and OCM 227. Additionally, debug ports, such as DAP 303 and JTAG 340 for example, can be locked. FPSoC 220 locking registers provides a means to lock access to boot subsystems until a power on reset is asserted. CPU 306 may be used to perform a secure boot and to lock/unlock boot subsystems, namely to lock boot subsystems when not in use. More particularly, CPU 306 may be used to lock/unlock boot subsystems which boot both PS 300 and PL 350. A boot flow of FPSoC 220 may default to a secure boot and may use an active disabling of such a secure boot for a non-secure boot.

Figures 1, 7:
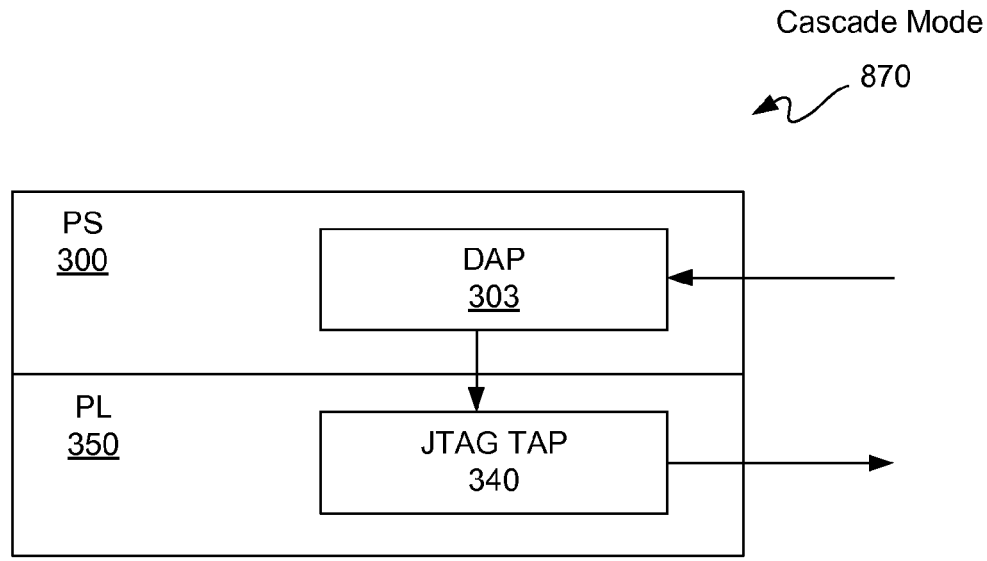
Figures 2, 7:
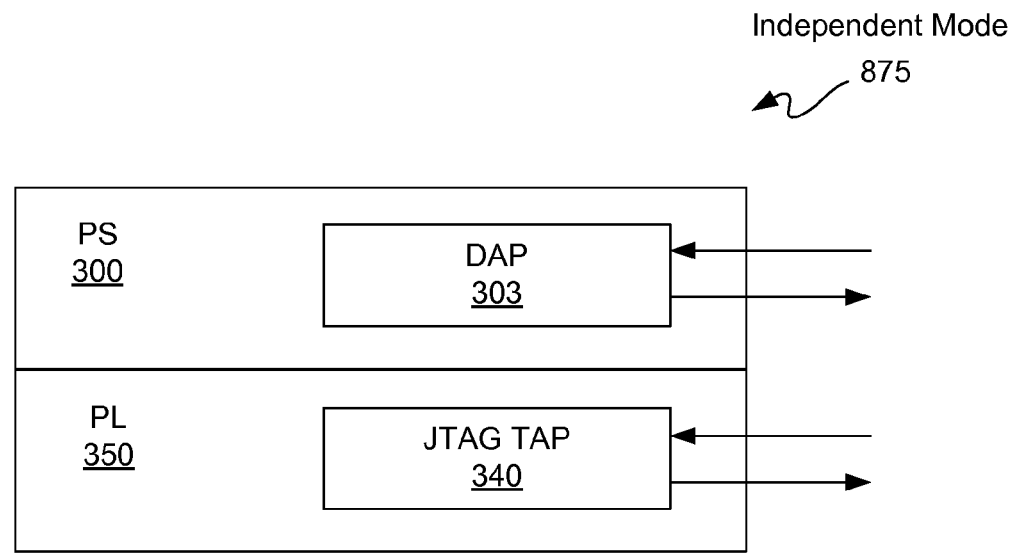

FIG. 7-1 is a block diagram of a cascade mode 870, and FIG. 7-2 is a block diagram of an independent mode 875, as separate debug hierarchies. DAP 303 may be used to debug PS 300, and a JTAG test access port ("TAP") 340 may be used to debug PL 350. Both modes 870 and 875 are JTAG chains, which chains can be configured as independent chains or concatenated into a single chain.

When active, JTAG ports provide an adversary access to I/Os, registers, and memory of FPSoC 220. PS DAP and PL TAP connections to PS DAP power-up in a disabled state. Since scan chain access may be not from device I/O but from PL 350, PL 350 is to be configured to access such scan chain. FPSoC 220 uses a multi-level hierarchy to disable access to JTAG ports. A JTAG port can be permanently disabled by eFuse array 354. A second level of enabling/disabling DAP 303 and JTAG 340 ports uses control registers. JTAG 340 ports are disabled at power-up and enabled for non-secure boot modes at a boot ROM code 229 to FSBL 211 handoff.

If an eFuse JTAG disable bit is not set, an authenticated FSBL or SSBL can re-enable such JTAG port. An active PL TAP can be disabled with PL logic or a PL bitstream. The bits for enabling/disabling DAP and JTAG ports may be or have redundancy to protect against an SEU from activating either or both of such ports, and this makes it more difficult for an adversary to enable such ports.

Readback of PL configuration memory 356 allows users to validate PL configuration memory content. Readback may be done using JTAG ports. If an adversary is able to readback configuration memory 356, PL 350 can be cloned. When a secure boot is used, readback of PL configuration memory 356 from any external interface of FPSoC 220, including without limitation JTAG ports, may be disabled.

FPSoC 220 provides on-chip hardware resources to boot FSBL 211 securely. Boot ROM code 229 runs multiple FSBL image verification tests and transitions FPSoC 220 into a secure lock-down state if there is a security problem. Security related registers are redundant, and locks on such registers protect against access of boot subsystems by an unauthorized user. FPSoC 220 provides confidentiality and authentication of images used by PS 300 and PL 350. Boot ROM code 229 starts a chain of trust for subsequent boot phases. Security features can be used by all bootloaders to maintain FPSoC 220 in a trusted state. FPSoC 220 includes countermeasures that increase security against attack in all boot phases.

Figure 8:
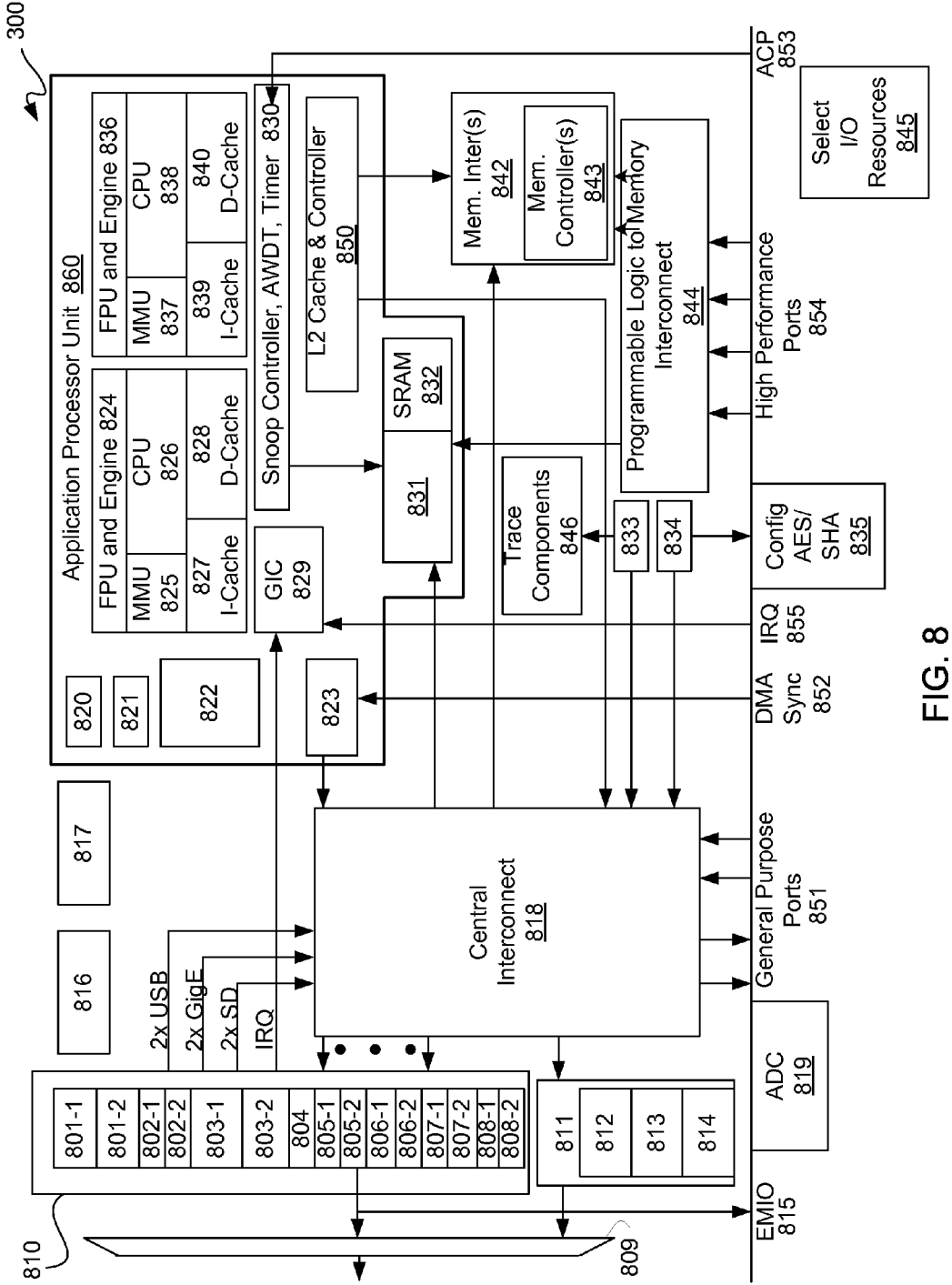
FIG. 8 is a block/circuit diagram depicting an exemplary processing system.

FIG. 8 is a block/circuit diagram depicting an exemplary PS 300. Generally, arrows indicate direction of control, such as from master device to slave device. Moreover, generally data flows in both directions.

Application processor unit 860 of PS 300 includes: watchdog timer 820; timer ("TTC") 821; system-level control registers 822; DMA channels 823; general interrupt controller ("GIC") 829; OCM interconnect 831; SRAM 832; L2 cache and controller 850; snoop controller, watchdog timer and timer block 830; floating point units ("FPUs") and general-purpose single-instruction multiple-data ("SIMD") engines 824 (e.g., ARM Neon engines) and 826; memory manager units ("MMUs") 825 and 837; single or multicore CPUs 826 and 838 (e.g., ARM Cortex-A9s); instruction caches ("I-caches") 827 and 839; and data caches ("D-caches") 828 and 840. Interrupts ("IRQs") from I/O peripherals 810 and/or IRQs 855 from programmable resources may be provided to GIC 829. Additionally, processing system 350 may include a clock generation block 816, a reset block 817, and select I/O resources 845, as well as application processor unit 860.

Processing system 350 may further include multiplexer I/O ("MIO") 809 coupled to I/O peripherals 810 and memory interfaces 811. I/O peripherals 810 may include Universal Serial Buses ("USBs") 801-1 and 801-2, gigabit Ethernet 802-1 and 802-2, SD SDIO 803-1 and 803-2, general-purpose I/O ("GPIO") 804, universal asynchronous receivers transmitters (UARTs) 805-1 and 805-2, control area network bus interfaces ("CAN") 806-1 and 806-2, I2C interfaces 807-1 and 807-2, and serial peripheral interface buses ("SPIs") 808-1 and 808-2. Memory interfaces 811 may include SRAM/NOR interface 812, open NAND flash interface ("ONFi"), 813, and QSPI controller 814. Memory interfaces 811 and I/O peripherals 810 may be coupled to an external MIO ("EMIO") 815.

Processing system 350 may yet further include I/O peripherals 810 and memory interfaces 811 coupled to central interconnect 818. Central interconnect 818 may be coupled to general purpose ports 851, DAP 833, DevC 834, L2 cache and controller 850, memory interfaces 842, OCM interconnect 831, and DMA channels 823. Memory interfaces 842 may include any of a variety of DDR controllers 843. DAP 833 may be coupled to trace components 846. OCM interconnect 831 may be coupled to programmable logic to memory interconnect 844, SRAM 832, and snoop controller, watchdog timer (e.g., an AXI watchdog timer), and timer block 830. DMA channels 823 may be coupled to receive DMA sync 852. DevC 834 may be coupled to AES/SHA configuration block 835. L2 cache and controller 850 may be coupled to memory interfaces 842. Snoop controller, watchdog timer, and timer block 830 may be coupled to ACP 853. High-performance ports 854 may be coupled to programmable logic to memory interconnect 844.

Isolation and access control may be used for embedded device security or computer security. Although it is unlikely that an adversary can access either PS 300 or PL 350 subsystems, additional isolation is provided by locking boot subsystems not in use. Along those lines, lock registers may be accessible to boot ROM code 229, FSBL 211, SSBL, and software applications. Until PS and PL clearing and error checking are completed, some boot subsystems, including SLCR, DevC, JTAG, and a PS-PL interface, may be locked, prohibiting access by either a legitimate user or an adversary.

At power-up, a level shifter isolates PS 300 and PL 350 regions. With PS 300 and PL 350 regions isolated from one another, an attack from PL 350 cannot affect PS 300. AES/HMAC engines, key source, DAP, security, and single event upset ("SEU") subsystems can be locked. Depending on boot mode, some boot subsystems are autolocked. The highest level lock mechanism is an eFuse array 354. A lock in such an eFuse array 354 cannot be changed, not even with a power or POR cycle.

AES/HMAC and RSA may be used to protect proprietary information, as FPSoC 220 may provide confidentiality, integrity, and authentication. An AES cryptographic algorithm, which may be a symmetric block cipher, may be used. For example, a 256-bit key implementation, which has over $10^{77}$ possible combinations, may be used. AES-CBC (i.e., AES cipher block chaining) encryption mode provides confidentiality of PS object code and PL configuration information, such as a configuration bitstream for example. An adversary may be thwarted from reading an image if it is encrypted in NVM. Authentication may use a public key, RSA (e.g., RSA-2048), and/or a private key HMAC algorithm. An adversary may not modify an image without being detected if such image is authenticated.

If BBRAM is used to store a key, a battery provides continuous power to such BBRAM is powered down. After a tamper event, a BBRAM based key can be erased. If an adversary tries to write a new BBRAM based key, such new BBRAM key is cleared and any PL configuration is erased.

FPSoC 220 may contain six forms of secure storage on-chip, inaccessible to an attacker, to facilitate bootloaders to boot securely. These forms of secure storage include an eFuse array 354, a BBRAM 256, a boot ROM 228, an OCM 227, an interconnect memory (e.g., AXI block RAM), and a PL configuration memory 356. Using a secure lockdown of FPSoC 220, L2 cache 850 can be used as on-chip memory. Secure storage may be used for a secure boot and may be useful for security in other phases of operation. Generally, storage is secure if it is on-chip and memory address and data lines are not externally accessible. When located in on-chip memory, data and code are generally secure and may be stored in an unencrypted format. OCM 227 may be used for secure storage of an FSBL 211.

Since OCM 227 is RAM, it is reusable after an FSBL 211 hands off control to an SSBL or other application code. AXI block RAM may likewise be secure memory, as well as OCM, as address/data lines of OCM and AXI block RAM do not connect to external pins of FPSoC 220. Furthermore, software can prevent external access to secure storage. If access to storage is to be restricted internally, from DMACs 309 for example, a trust zone (e.g., an ARM trust zone) can provide isolation of secure storage.

Sensitive data stored off chip in NVM may, and should, be encrypted. FSBL and PL information, such as bitstreams for example, may be stored in encrypted format in flash or SD memory. DMAC 309 may move partitions, such as for FSBL 211 and other information stored in NVM, through AES engine 352 and HMAC engine 353 to OCM 227 and PL configuration memory 356, respectively.

For security, application code can be stored in encrypted form in flash or SD memory. Application code may generally be decrypted and moved to RAM 304. While application code may be object code, an adversary can monitor PCB address and data lines in order to attempt to understand such object code. To increase security of application code, application code can be decrypted and moved to OCM 227 or AXI block RAM. An eFuse array 354 may provide secure storage for an RSA public key hash and an AES/HMAC key.

Figures 1, 6:
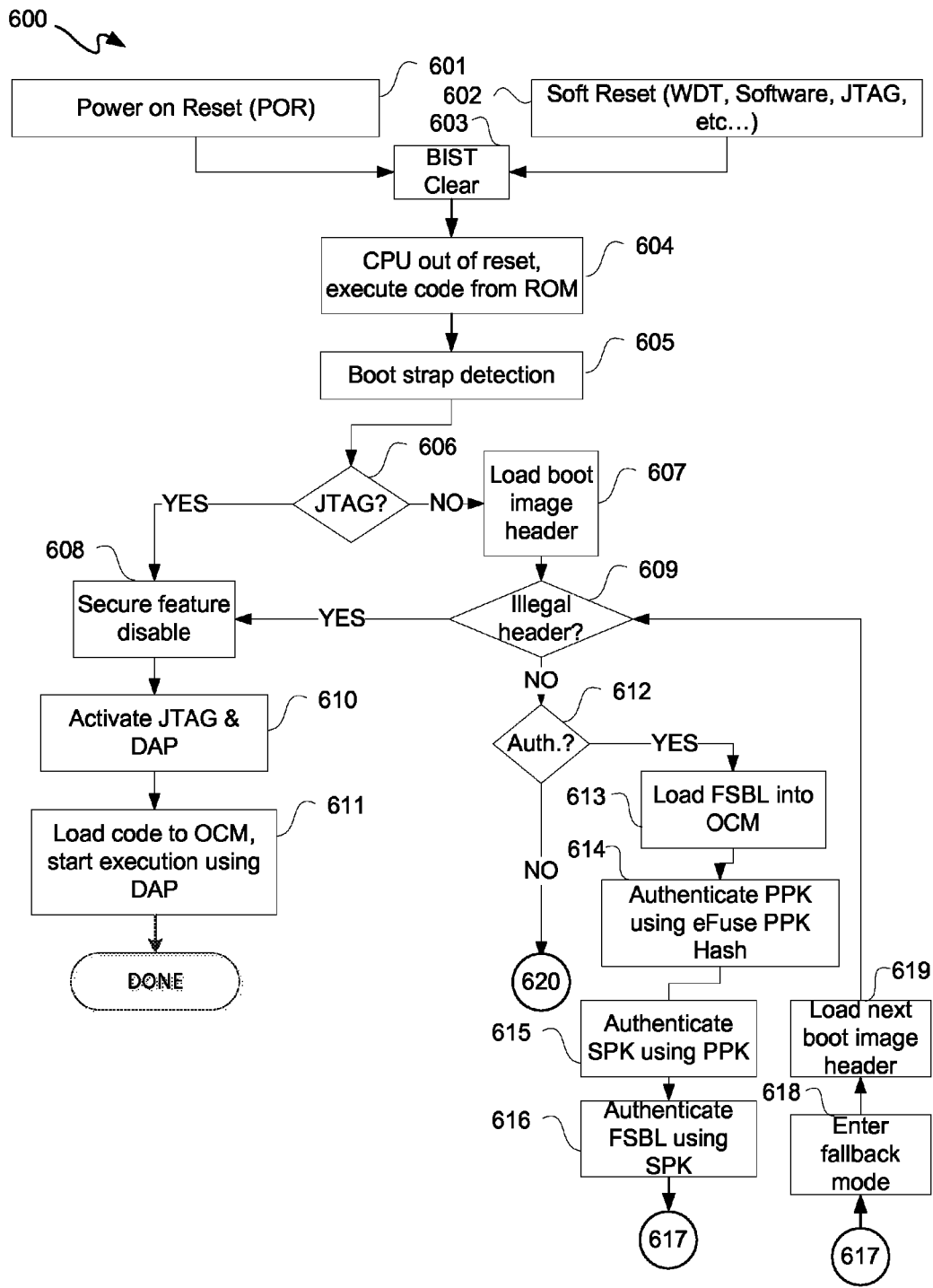
Figures 2, 6:
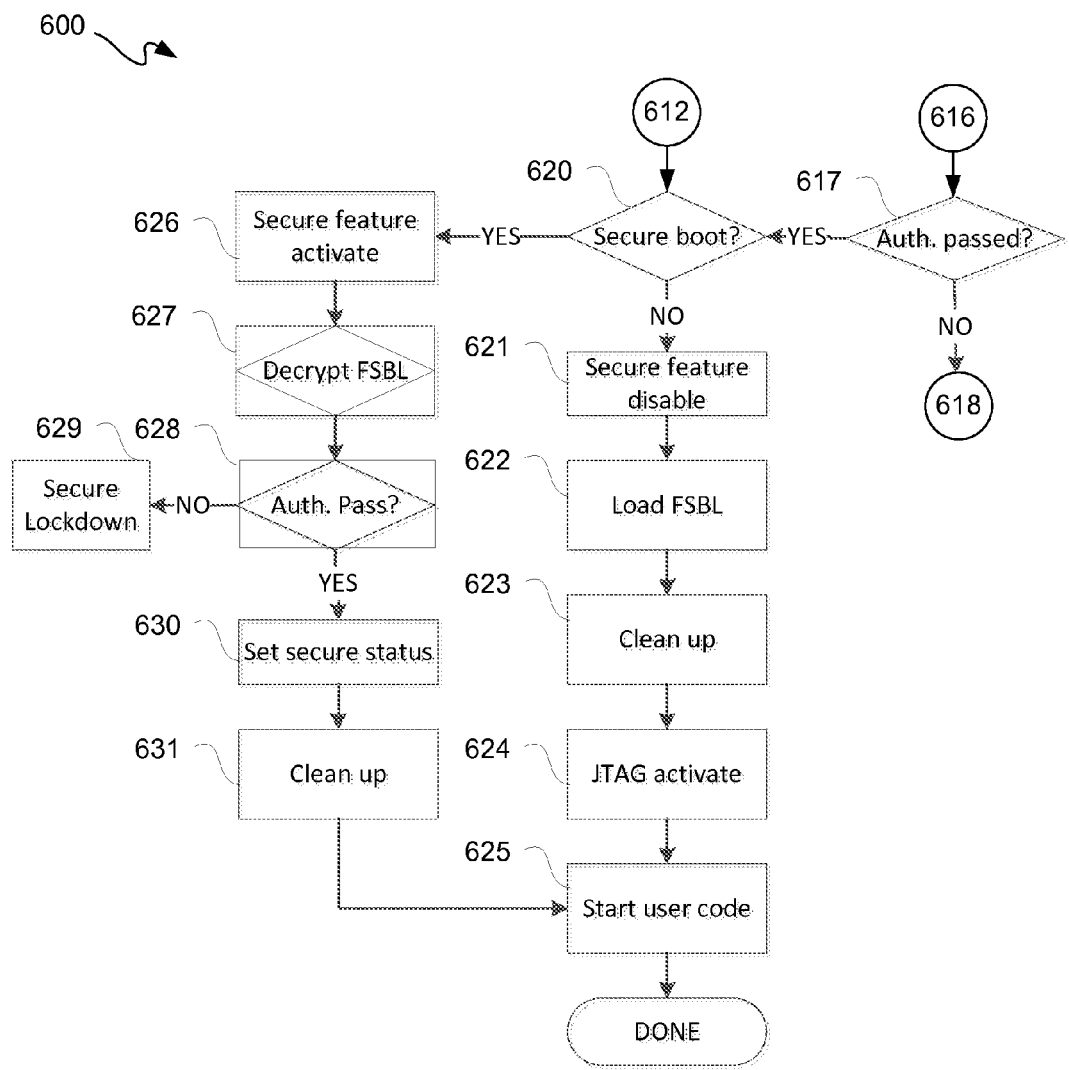

With the above description borne in mind, FIGS. 6-1 and 6-2 ("FIG. 6"), which is a flow diagram depicting an exemplary boot ROM code flow 600, such as may be used for boot ROM code 229 for example, is described. FIG. 6 is described with simultaneous reference to FIGS. 1 through 8. Generally, states are described below as being associated with states of finite state machines ("FSMs") of hardware of FPSoC 220, which may be invoked as part of execution of secure boot.

At 601, an out-of-power-on-reset ("POR") state may be invoked. State 601 may be invoked by toggling a POR pin associate with PS 300 or turning power on and off for SoC

220. In state 601, a secure enable signal may be reset, and boot mode pins may be latched. A JTAG chain to a PL TAP controller may be enabled, and a DAP controller may be disabled. Such PL JTAG may be protected by either a security monitor or disabling a JTAG port 340 as part of a bitstream option.

State 602 may be an out-of-software-reset state. A DAP controller may be disabled for a soft reset, and a JTAG DAP controller chain may be activated for a soft reset. Again, a PL JTAG may be protected as previously described by assertion of a program signal. For state 602, a secure enable may keep the same value it originally had. In either of states 601 or 602, all JTAG debug modes may be disabled, and access to boot ROM code 229 may be activated.

At 603, a clear of a built-in self-test ("BIST") may be invoked. State 603 may follow after a PLL lock may be obtained from state 601 or a soft reset may be asserted at 602.

At 604, CPU 306 may be taken out of a reset state for execution of boot ROM code 229 from boot ROM 228.

At 605, a detection of bootstrap pins may be made and used to determine whether JTAG is to be activated. If JTAG is to be activated at this point, then a secure boot cannot take place. A security features, such as boot subsystems, may be disabled to avoid exposure to attack. JTAG may be activated, and a JTAG boot may be used with DAP-AP activated as described below in additional detail. For a JTAG boot, a CPU may be idled, and a JTAG debug tool may upload code into OCM and/or external RAM. For example, for a legal or valid boot mode, a boot mode specified at bootstrap pins cannot define a boot mode which conflicts with that specified in a boot header of a boot image.

At 606, it may be determined whether a default JTAG mode has been disabled, such as by programming another eFuse or other NVM control bit for example. If at 606 it is determined that a default JTAG mode has not been disabled, then at 607 a boot image header may be loaded. Such loading may be part of a hardware driven default mode may be invoked where security features are disabled along with a PCAP, and PL 350, PS 300, and JTAG are all enabled. If at 606 it is determined that a default JTAG mode has been disabled, then at 608 another hardware driven default mode may be invoked where security features are disabled along with a PCAP and JTAG, and PL 350 and PS 300 are both enabled. Along those lines, if disabling of hardware security is asserted, CPU 306, which may check the status of a configuration register before a boot sequence may be initiated, may immediately enter a halt mode. As described elsewhere herein, JTAG or other test access port subsystems, as well as other subsystems of FPSoC 220 not used for a secure boot, may be locked for a secure boot. Along those lines, configuration interfaces not used for a secure boot may be locked. Boot ROM code 229 may be used to write to register to disable ROM code readback. CPU 306 may disable boot ROM code 229 access, including disabling of a readback thereof. In order to hide boot ROM code 229 from a default secure boot mode or a test scan mode, only an insignificant amount of such code may be allowed to be read at a time. Operations associated with mode 608 may all occur simultaneously.

Boot ROM code 229 may execute from boot ROM 228, in contrast to execution from for example shadow RAM. Along those lines, a small portion of boot ROM code 229 may be written to OCM 227. Along those lines, at 609 it may be determined whether a boot image header loaded at 607 is legal or not. For example, a checksum or CRC may be determined, or other information from a boot header may be used, to make a determination as to whether a boot image header is valid or legal. If, at 609, it is determined that a boot header loaded from a boot image stored in a selected boot device, such as an NVM for example, is invalid or illegal, then mode 608 is invoked.

Security features, such as boot subsystems, may be disabled to avoid exposure to attack, and JTAG may be activated. A JTAG boot may be used with a DAP-AP activated as described below in additional detail.

From mode 608, at 610, JTAG 340 and DAP 303 are activated. At 611, code in such boot image may be loaded to OCM 227, and execution of such code may begin using DAP 303 for a non-secure boot mode. For a non-secure boot mode, the locking of registers may be invoked, including locking of SLCR 305, DevC 311 configuration including locking DMAC 309, locking eFuses 354, locking configuration interfaces (e.g., interface 311, PCAP 312 and ICAP 390), and encryption-decryption-authentication circuitry (e.g., authenticator 230, encryptor 235, and decryptor 231). Along those lines, PS 300 and PL 350 subsystems may be isolated from one another; key swap in a multi-boot mode are prevented; and boot mode changes in a multi-boot mode are prevented. Boot ROM 228 supports the capability to fallback and reload to a "golden image" (i.e., "multi-boot"). If FSBL 211 is plaintext, any subsequent golden images are likewise plaintext. Likewise, if FSBL 211 is cipher text, any subsequent golden image is also encrypted with the same key as FSBL 211. For a secure boot, NVM settings may be used to determine that keys are not swapped.

If, however, at 609 it is determined that a boot header is valid or legal, then at 612 it is determined whether authentication, such as an RSA authentication or a digital signature algorithm ("DSA"), has been invoked. A local copy of a boot image header may be stored in OCM 227 for use in subsequent decisions, validations, and use operations of boot ROM code 229. If authentication has been invoked as determined at 612, then at 613 an FSBL 211, such as an FSBL partition 421 and AC 422 of a boot image 420 for example, may be loaded into OCM 227.

A stored version of such boot header stored in OCM 227 may be used for the following authentication operations. At 614, such FSBL 211 loaded at 613 may be checked for authenticity ("authenticated"). It may be determined whether such boot header has a key match, where such key may be obtained from a boot BRAM (i.e., a battery-backed RAM or BBRAM) or an eFuse array. Along those lines, at 614, a primary public key ("PPK") obtained form an AC of such FSBL loaded may be hashed and such hashed result compared to a PPK hashed result stored on-chip, such as programmed for example into OTP elements of an eFuse array or stored in BBRAM. An on-chip hardware-based authenticator may be used to obtain such hash result. Such hash value may be stored in local memory, such as OCM 227 for example, for subsequent use. CRC or checksum determination are just two forms of design rule checks; however, boot information may include either or both of these and/or one or more of the following: any key swapping, any conflicting information between a boot header and boot mode pins, any disagreement in eFuses, boot header, and boot mode pins, or any boot mode changes during multiboot. Any or all of these forms of boot information may be checked for a violation.

At 615, a secondary public key ("SPK") may be authenticated, such as for example by using PPK to authenticate such an SPK. Such SPK may be obtained from an FSBL 211 loaded at 613, and such PPK may be stored on-chip, such as programmed for example into OTP elements of an eFuse array or stored in BBRAM.

At 616, such FSBL 211 loaded at 613 may be authenticated using such SPK authenticated at 615. Generally, FSBL signature verification may be performed, such as for example whether an RSA (SPK, FSBL signature) matches an SHA (FSBL certificate image). Along those lines, a boot image may be loaded by a core of CPU 306 from a flash memory into OCM 227.

At 617, it may be determined whether each of the authentication operations performed, such as for example at operations 614 through 615, passed. If, at 617, it is determined that authentication did not pass, then at 618 a fallback mode is entered, such as for example as previously described for a multi-boot mode. Along those lines, a next boot image header is loaded at 619, and a check for validity of such boot header loaded at 619 is made at 609, as previously described.

At 620, it may be determined whether a secure boot mode is to be invoked provided, however, that authentication passed as determined at 617 or authentication was not invoked as determined at 612. If, at 620, it is determined that a secure boot mode is not to be invoked, then at 621 security features are disabled, such as previously described with reference to mode 608. At 622, an FSBL 211 may be loaded, if not previously done so. At 623, on-chip memory and registers may be erased, reset, or otherwise cleaned to remove any residue of any security features, such as authentication for example. At 624, JTAG 340, including DAP 303, may be activated, as previously described for operation 610. At 625, user code, such as from a boot image or loaded by a boot loader of a boot image, may be started, run, or otherwise executed.

If, however, at 620, it is determined that a secure boot mode is to be used, as authentication passed at 617 or a bootstrap pin read at 605 indicated a secure boot mode, though without authentication, then at 626 security features may be activated. This may involve activating security subsystems, such as unlocking a decryptor and an authentication engine including interfaces to and from such subsystems. Along those lines, parameters specified in NVM of FPSoC 220 may be determined to be valid at 620 for a secure boot to occur. For example, no key swapping, such as from BBRAM to eFuses, or no changing of a key at all. NVM, such as eFuses, of FPSoC 220 may be used to permanently disable JTAG and/or only allow a secure boot for example; however, a user may not want to make such unchangeable decisions. Along those lines, an eFuse control bit may be used to indicate to obtain control information, including without limitation a key, form BBRAM, which may be changed from time-to-time. Generally, eFuses may be used however to store an AES key and one or more RSA keys, as well as control bits as described herein.

At 627, an FSBL 211 loaded, which is determined to be encrypted at 627, may be decrypted at 627. For example, an AES decryption engine 352 may be used for this decryption. Along those lines, FSBL 211 may or may not be encrypted as stored in a boot image. At 628, such FSBL 211 in plaintext, whether having been decrypted or not, may be authenticated by an authentication engine, such as HMAC engine 353 for example, and determined if such authentication operation was passed. If, at 628, it is determined that such authentication failed, then a secure lockdown mode is initiated at 629. Such a secure lockdown mode may involve locking all of SoC 220, such that only a POR or other power cycling may be used to exit such secure lockdown state.

If, however, at 628 it is determined that authentication passed, then at 630 a secure status may be set. In other words, a secure boot has occurred to establish a root of trust. Along the above lines, one or more of the following may be provided for such a secure status: unlocking SLCR 305, unlocking DevC 311 configuration including unlocking DMAC 309, unlocking eFuses 354, unlocking configuration interfaces, including interfaces 311, 312 and 390 so PS 300 and PL 350 subsystems can communicate with one another, unlocking any encryption-decryption-authentication circuitry currently locked such as decryptor 231, allowing key swapping in a multi-boot mode, and allowing boot mode changes in a multi-boot mode. In particular, locked configuration registers, which are unlocked to provide an isolation barrier between PS 300 and PL 350 are unlocked. At this point, an FSBL 211 may be read from memory 210 and loaded into OCM 227.

At 631, residue of such secure boot may be cleaned up as previously described with reference to operation 623. Along those lines, DevC 310 registers may be cleared of any and all values. After cleanup at 631, user code may be started at 625, as previously described.

Figure 9:
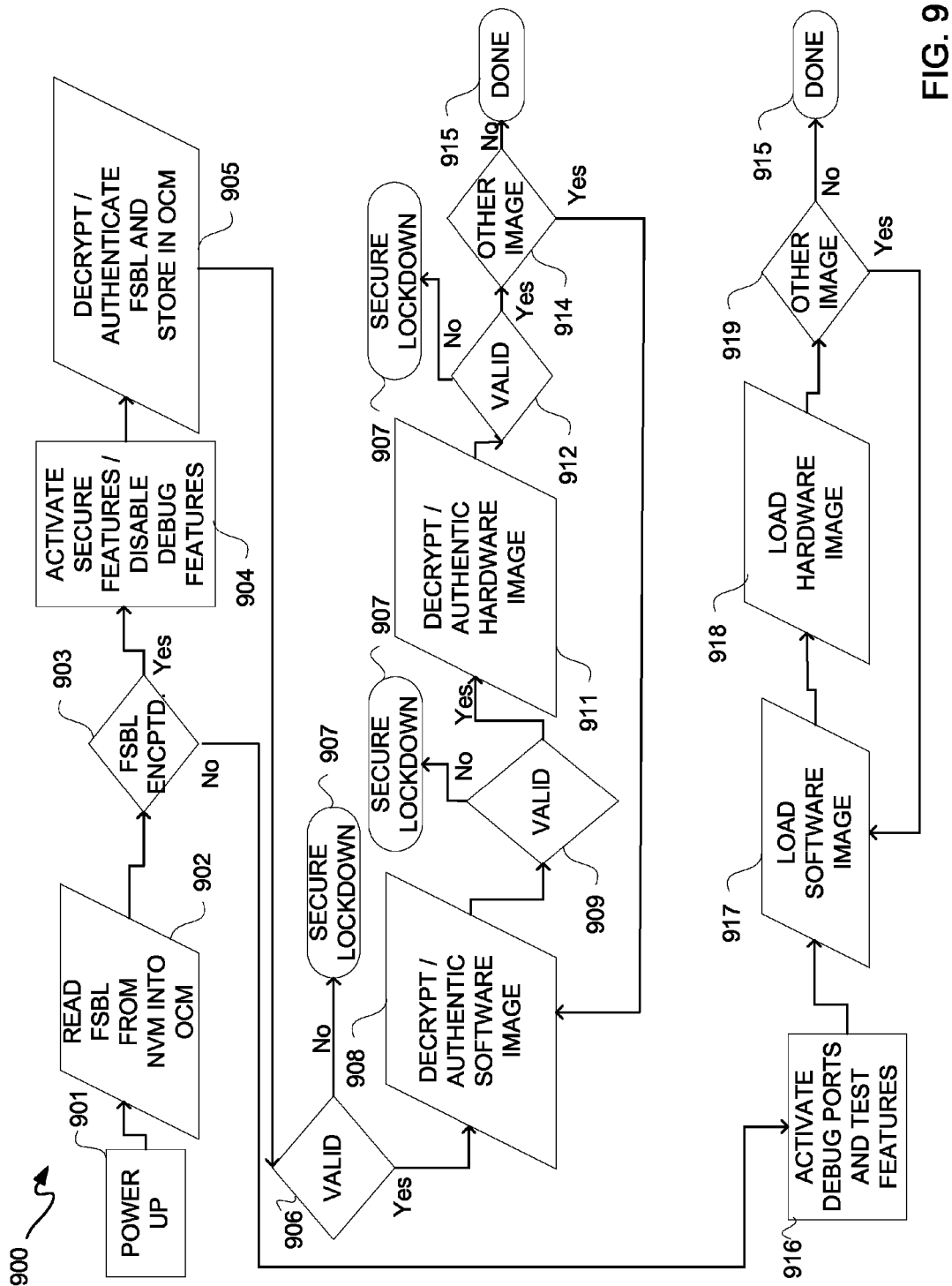
FIG. 9 is a flow diagram depicting an exemplary secure boot flow.

With the above description borne in mind, a secure boot, as well as utilization thereof, is described at a high level. However, in order to appreciate enhanced security of a secure boot with additional authentication as illustratively depicted in FIG. 10 as described below herein, FIG. 9, which is a flow diagram depicting an exemplary secure boot flow 900, is described for purposes of reference.

At 901, FPSoC 220 is powered up. At 902, an FSBL 211 is read from memory 210 into OCM 227. At 903, it is determined whether such FSBL 211 read at 902 is encrypted. After power up at 901, FPSoC 220 is exposed to threats at 902 and 903, which reduces trust level for a root of trust stemming from a secure boot of FPSoC 220.

If at 903 it is determined that FSBL 211 is encrypted, then at 904 secure boot features may be activated and debug features may be disabled. At 905, FSBL 211 is decrypted and authenticated for storage in OCM 227. At 906, AES engine 352 or HMAC engine 353 may be used to determine whether such FSBL 211 stored in OCM 227 is valid. If at 906 invalidity of FSBL 211 is determined, a secure lockdown is initiated at 907.

If, however, at 906 validity of FSBL 211 is determined, at 908 FSBL 211 may be used to read a software image 214 such as from memory 210, and such read software image 214 may be decrypted and authenticated at 908. At 909, AES engine 352 or HMAC engine 353 may be used to determine whether such software image 214 is valid. If at 909 invalidity of such software image 214 is determined, a secure lockdown is initiated at 907. If, however, at 909, validity of such software image 214 is determined, at 911 a hardware image 215 may be read from memory 210, and such hardware image 215 may be decrypted and authenticated at 911.

At 912, AES engine 352 or HMAC engine 353 may be used to determine whether such hardware image 215 is valid. If at 912 invalidity of such hardware image 215 is determined, a secure lockdown is initiated at 907. If, however, at 912, validity of such hardware image 215 is determined, then at 914 a check for one or more additional images may be performed. If at 914 it is determined that no additional image is to be processed, such as from memory 210, secure boot flow 900 is done at 915. If, however, at 914 it is determined that an additional image is to be processed, such as from memory 210, then at 908 another software image may be read for decryption and authentication, as previously described.

If, however, at 903 it is determined that FSBL 211 is not encrypted, namely plaintext, then at 916 debug ports and other test features may be activated. At 917, a software image 214 may be loaded, such as from memory 210, and at 918, a hardware image 215 may be loaded, such as from memory 210. At 919, a check for one or more additional images may be performed. If at 919 it is determined that no additional image is to be processed, such as from memory 210, secure boot flow 900 is done at 915. If, however, at 919 it is determined that an additional image is to be processed, such as from memory 210, then at 917 another software image may be read, as previously described.

In addition to exposure to threats at 902 and 903, secure boot 900 is exposed to threats at 916 through 919. Accordingly, a more secure boot of an FPSoC would provide a more trusted root of trust. Along those lines, FIG. 10 is a flow diagram depicting an exemplary secure boot flow 1000 with additional authentication, which is more secure than secure boot flow 900.

Figure 10:
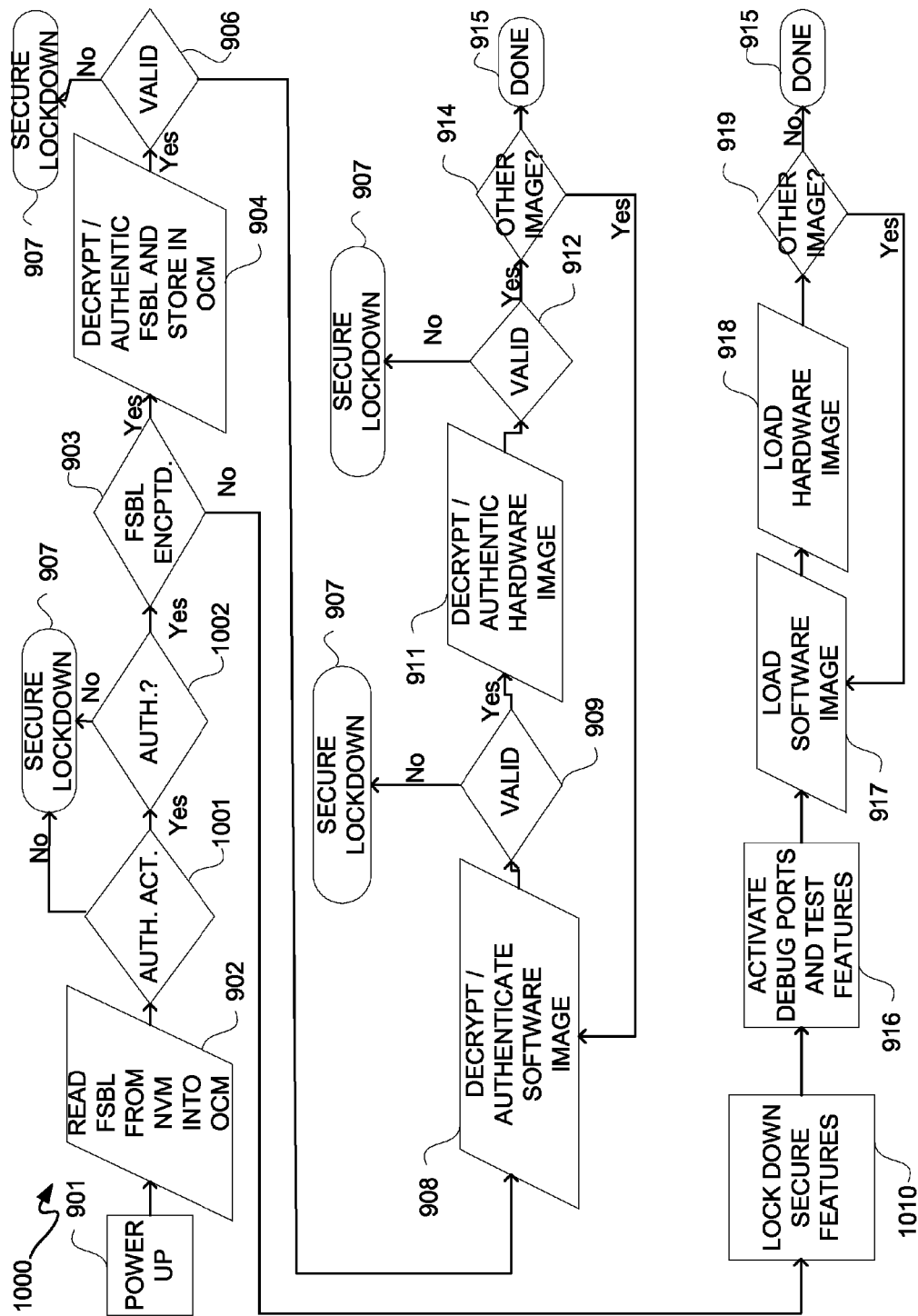
FIG. 10 is a flow diagram depicting an exemplary secure boot flow with additional authentication, which is more secure than secure boot flow of FIG. 9.

With reference to FIG. 10, at 901 FPSoC 220 is powered up. At 902, FSBL 211 is read from memory, such as memory 210, into OCM 227, such as previously described. However, after such read of FSBL 211, at 1001 a security feature, such as RSA DSA for example, is activated. If for any reason this security feature is not activated at 1001, a secure lockdown may be invoked at 907. If, however, at 1001 such security feature is activated, then at 1002 it is determined whether a boot header of a boot image is authentic. If at 1002 it is determined that a boot image is not authentic, then a secure lockdown may be invoked at 907. If, however, at 1002 it is determined that a boot image having FSBL 211 is authentic, then at 903 it is determined whether such FSBL 211 is encrypted. Accordingly, it should be appreciated that prior to any decryption of an FSBL, an authentication of a boot image for such FSBL, such as an RSA authentication for example, is performed to enhance security.

Operations 905, 906, and 908 through 915, may be the same as previously described, and thus are not repeated for purposes of clarity.

If at 903 and FSBL 211 is not encrypted, then at 1010 a lockdown to secure features of FPSoC 220, such as boot subsystems for example, is performed. Operations 916 through 919 may be the same as previously described, and thus are not repeated for purposes of clarity. However, it should be appreciated that by invoking a lockdown at 1010 of secure features of FPSoC 220 prior to activation of debug ports and/or test features, as well as prior to loading any software and/or hardware images, features associate with the security of FPSoC 220 are lockdown to enhance security.

It should be appreciated that by having a secure boot, such as secure boot flow 1000, as a default way to start FPSoC 220, users actively have to disable such security policy if a non-secure boot is to be used. Secure boot flow 1000 may be controlled by a user with boot mode select tens of FPSoC 220 and a BH, such as previously described. Again, a BH may be a user defined fields in a boot image stored in NVM. For secure boot flow 1000, RSA, AES, and HMAC circuitry of FPSoC 220 may be activated at power up. However, if any BL detects a security violation, or if there is a valid user request to boot an unencrypted image, such security subsystems are disabled or deactivated. As previously described, an attempt to boot securely in a mode not supported by a secure boot as described herein, causes CPU 306 to transition FPSoC 220 into a secure lockdown state. For example, if bits read from a BH in memory 301 fail a consistency check with bits read from eFuse array 354, CPU 306 transitions FPSoC 220 into a secure lockdown state. Furthermore, in addition to booting securely at start up, if any boot phase uses encryption, an initial boot phase thereof likewise uses encryption. For example if any image subsequent to an FSBL is to be decrypted, such as AES decrypted for example, an FSBL preceding such image is required to be encrypted for decryption, such as AES decryption for example. Along those lines, intermediate boot phases can either boot images that are both encrypted and authenticated or neither encrypted nor authenticated. For example, if a PL configuration bitstream is to be decrypted using AES engine 352 and authenticated using HMAC engine 353, and FSBL 211 preceding such PL configuration bitstream is likewise decrypted using AES engine 352 and authenticated using HMAC engine 353. This reduces FSBL vulnerability to threats by adversaries, and likewise facilitates a chain of trust among bootloaders in a secure boot sequence.

Again, a default boot to secure boot functionality is provided using an on-chip bootloader, where a CPU controls execution of such secure boot as previously described. Effectively, FPSoC 220 boots using CPU 306 to self-load PS MPL images. Boot ROM code 229 provides RSA code signing for such an on-chip bootloader, which may involve hard coding, namely generally "coding in silicon." Because of such a processor-based configuration, functions may be made available for user-defined FSBLs and SSBLs. For a non-secure boot, RSA, AES, HMAC, and other boot subsystems are actively disabled.

To recapitulate, after power-on and reset sequences have completed, an on-chip boot ROM 228 begins to execute boot code 229. The boot ROM 228 starts by checking a boot mode specified by bootstrap pins 290. The boot ROM 228 then reads a boot header 501 from a specified external memory 210. If a secure boot is specified in a boot image header 501, the boot ROM 228 starts by checking the power-on status of the PL 350. Because the AES and HMAC engines 353, 353 reside within the PL 350, the PL 350 is powered up to perform a secure boot. After the power-on status of the PL 350 is confirmed, the boot ROM 228 begins to load the encrypted FSBL 211 into the AES engine 352 via the PCAP 312. Once decrypted, the PL 350 sends the plaintext FSBL 211 back to the PS 300 via the PCAP 312. The decrypted image is then loaded into the OCM 227. The PS 300 monitors the authentication status of the PS image 211 or PL bitstream 212. If an HMAC authentication error occurs, the PS 300 enters security lockdown. Once the PS image 211 has been successfully loaded and authenticated, control is turned over to the plaintext FSBL 211 which now resides in the OCM 227. Based on a user application, the FSBL 211 could then either start processing, configure the PL 350, load additional software, or wait for further instruction from an external source.

Because the encrypted FSBL 211 loaded in a secure boot is "trusted", it is possible to load additional PS images in plaintext mode. PL partial re-configuration bitstreams can be loaded via the PCAP-ICAP or ICAP interface as either cipher text or plaintext. Subsequent PS images or PL bitstreams use the same key source as the FSBL.

PS 300 device configuration interface 310 contains a security policy block, namely secure vault 308, that is used to monitor a system security. When conflicting status is detected either from the PS 300 or the PL 350 that could indicate inconsistent system configuration or tampering, a security lockdown is triggered. In a security lockdown the on-chip RAM 227 is cleared along with all the system caches. The PL 350 is reset and the PS 300 enters a lockdown mode that can only be cleared by issuing a POR. The following conditions cause a security reset: non-secure boot and eFuse secure boot set; PS DAP enabled and JTAG chain disable eFuse set; SEU error tracking activated in the PS 300 and the PL 350 reports an SEU error; a discrepancy in the redundant AES activation logic; or software sets the force reset bit of the DevC register.

In secure boot, the PS DAP and the PL TAP controllers 303, 340 are bypassed by default, eliminating any JTAG access to the AP FPSoC 220. JTAG access can be restored in a secure mode by the FSBL 211 or subsequent PS images as these applications are considered trusted. Access to DAP enable registers 303 can be locked out using a DevC 310 lock register. The PS DAP controller 303 can be permanently bypassed using a JTAG chain disable eFuse of eFuse array 354. The JTAG access to the PL 350 can be disabled by setting a disable JTAG configuration option when creating a PL bitstream.

Whenever an encrypted bitstream is loaded into the PL 350, readback of the internal configuration memory 356 cannot be performed by any of the external interfaces, including JTAG 340. The only readback access to the configuration memory after an encrypted bitstream load is via PCAP-ICAP 312-390 or ICAP 390. The PCAP-ICAP and ICAP interfaces are trusted channels since access to these interfaces are from an authenticated PS image or an authenticated PL bitstream.

With a secure boot having completed, system 200 may be considered a trusted system. Along those lines, access control may be based off such trusted system, as described below in additional detail.

Figure 11:
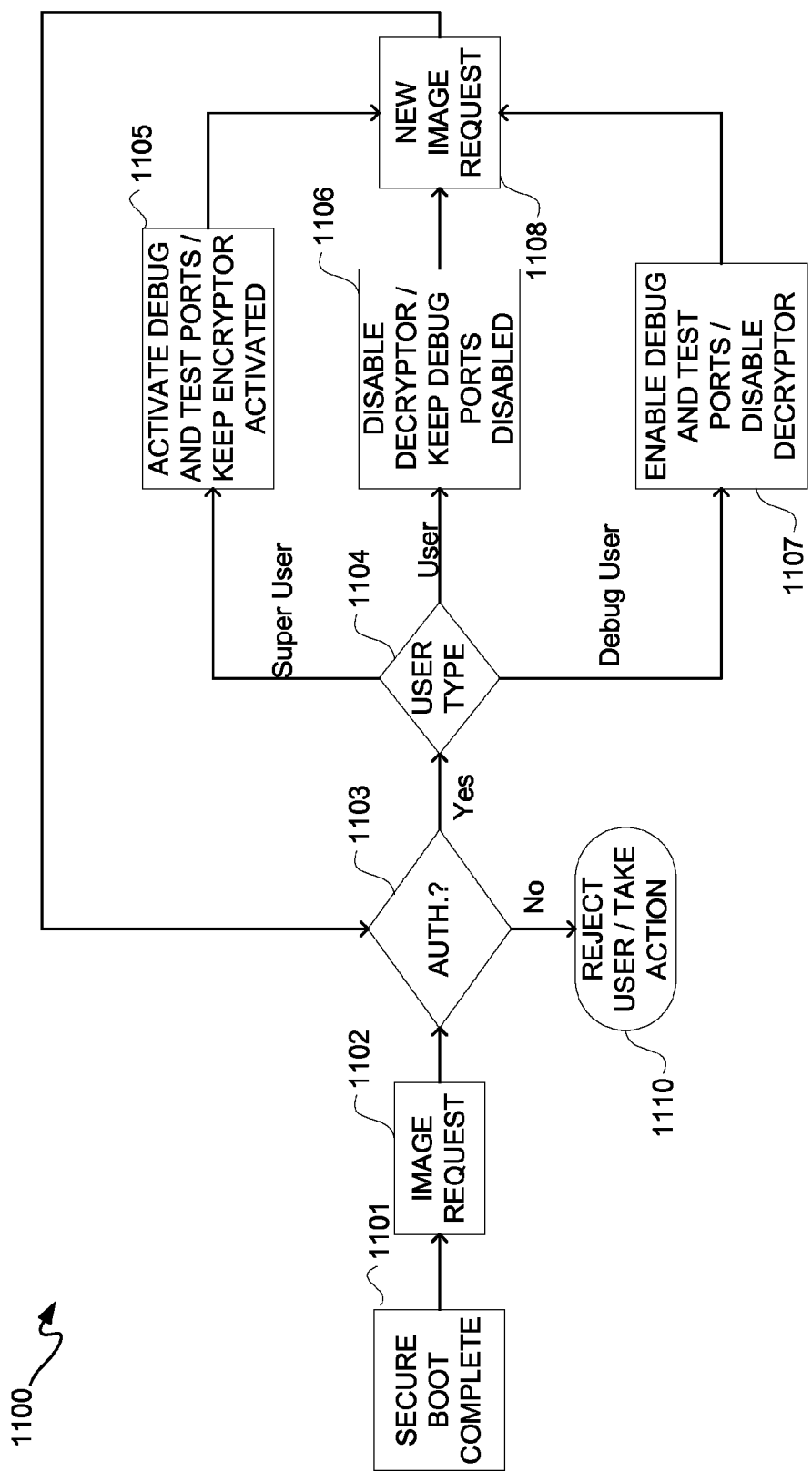
FIG. 11 is a flow diagram depicting an exemplary access control flow.

FIG. 11 is a flow diagram depicting an exemplary access control flow 1100. Access control flow 1100 may be used to allow users of various levels of trust to access system 200 with varying degrees of capabilities while maintaining security.

At 1101, a secure boot has completed, such as previously described for example with reference to FIGS. 6 and 11. At 1102, a request is made for a new or another image not already loaded as part of secure boot 1101. Such new image may be stored in memory 210 for example. At 1103, an RSA authentication on such new image may be performed, such as previously described with reference to operation at 1002. If at 1103 it is determined that the new image obtained at 1102 is not authentic, at 1110 a user trying to load such new image into FPSoC 220 is rejected, and appropriate action may be taken, including without limitation a secure lockdown of FPSoC 220. If, however, at 1103 it is determined that such new image is authentic, then at 1104 a user type may be determined. In this example there are three user types, namely a super user, a guest user, and a debug user; however, these or other classifications of users may be used in other examples.

If at 1104 it is determined that a super user has loaded a new image, at 1105 debug and test ports 304 and 340 may be activated and encryptor 235 may be maintained in a activated status. If at 1104 it is determined that a guest user has loaded a new image, at 1106 decryptor 231 or AES engine 352 may be disabled and debug ports 304 and 340 may be maintained in a disabled status. If at 1104 it is determined that a debug user has loaded a new image, then at 1104 debug and test ports 304 and 340 may be activated and decryptor 231 or AES engine 352 may be disabled. From any of 1105, 1106, or 1107, another new image request may be made at 1108, and access control flow 1100 may loop back to RSA authentication at 1103 for any such new image requested to be loaded into FPSoC 220.

Accordingly, as a trusted host, FPSoC 220 may control register access, such as locking and unlocking registers, as well as other system access. Such a system access may vary depending on level access control by user type. A user type as determined at 1104 may be indicated as part of such loaded image.

By using a combination of hardware, software, and fabric-based soft configuration, it is possible to provide side channel (e.g. Differential Power Analysis—DPA) attack resistance within a FPSoC 220. Suppose for example hardware-based decryption engine 352 is not intrinsically side-channel attack resistant; however, a more robust decryption engine 231 instantiated in programmable fabric 242 may be more intrinsically side channel attack resistant. Because FPSoC 220 uses an authentication algorithm (e.g., RSA-2048) as part of its initial boot load procedure, and because such authentication algorithm may be unchangeable and in hardware (e.g., masked ROM code), resistance to DPA may be provided by generally using a short FSBL for purposes of initial authentication by such hardware-based decryption engine. Such short FSBL mitigates against DPA due to having a limited amount of data an adversary can collect. Generally, DPA uses many data samples to extract a secret via statistical analysis out of the side-channel "noise".

However, since FPSoC does have RSA authentication or other private/public type algorithm, this can be used as a "building block" in order to achieve side-channel resistance. Basically, by having "pre-authentication" of a statistically short message with respect to a DPA attack, the amount of data presented to a hardware-based DPA-susceptible decryptor 352 is limited. After authentication based on such short message, a DPA-resistant decryptor 231 (e.g., one that uses "key-rolling" as an example) may be instantiated in programmable fabric 242 using a PL image. Such programmable fabric 242 instantiated decryptor 231 may thereafter be used to decrypt a remainder of a user's software image and/or FPGA logic configuration bitstream. Thus for example, software pre-authentication may be performed using SHA-256/RSA-2048, and a soft core to complete authentication may employ AES-256 with key rolling.

To mitigate against DPA side channel attacks, a PL bitstream may be separated into an initialization bitstream, which may be unencrypted, and a user bitstream, which may be made up of smaller, partial bitstreams or blocks. Each of these blocks may be encrypted on its own unique key. Such initialization bitstream may be authenticated by an RSA algorithm, such as by FSBL code, and such initialization bitstream may contain a soft decryptor. Such soft decryptor may be instantiated in PL 350, and PL 350 may then decrypt such user bitstream, which may be made up of encrypted partial bitstreams or blocks. Key rolling may be used to decrypt the entire user bitstream, namely a key for block n+1 is embedded in the previous encrypted block n. There are two ways of getting the initial key into such soft PL decryptor: Such initial key may be located in an authenticated and encrypted FSBL (which is decrypted by a hard PL decryptor, and such decrypted key may be transferred into such initialization bitstream for use by such soft PL decryptor. Or, optionally, such initial key may be generated by a Physically Unclonable Function ("PUF") in PL 300 and then transferred to such soft PL decryptor.

Figure 12:
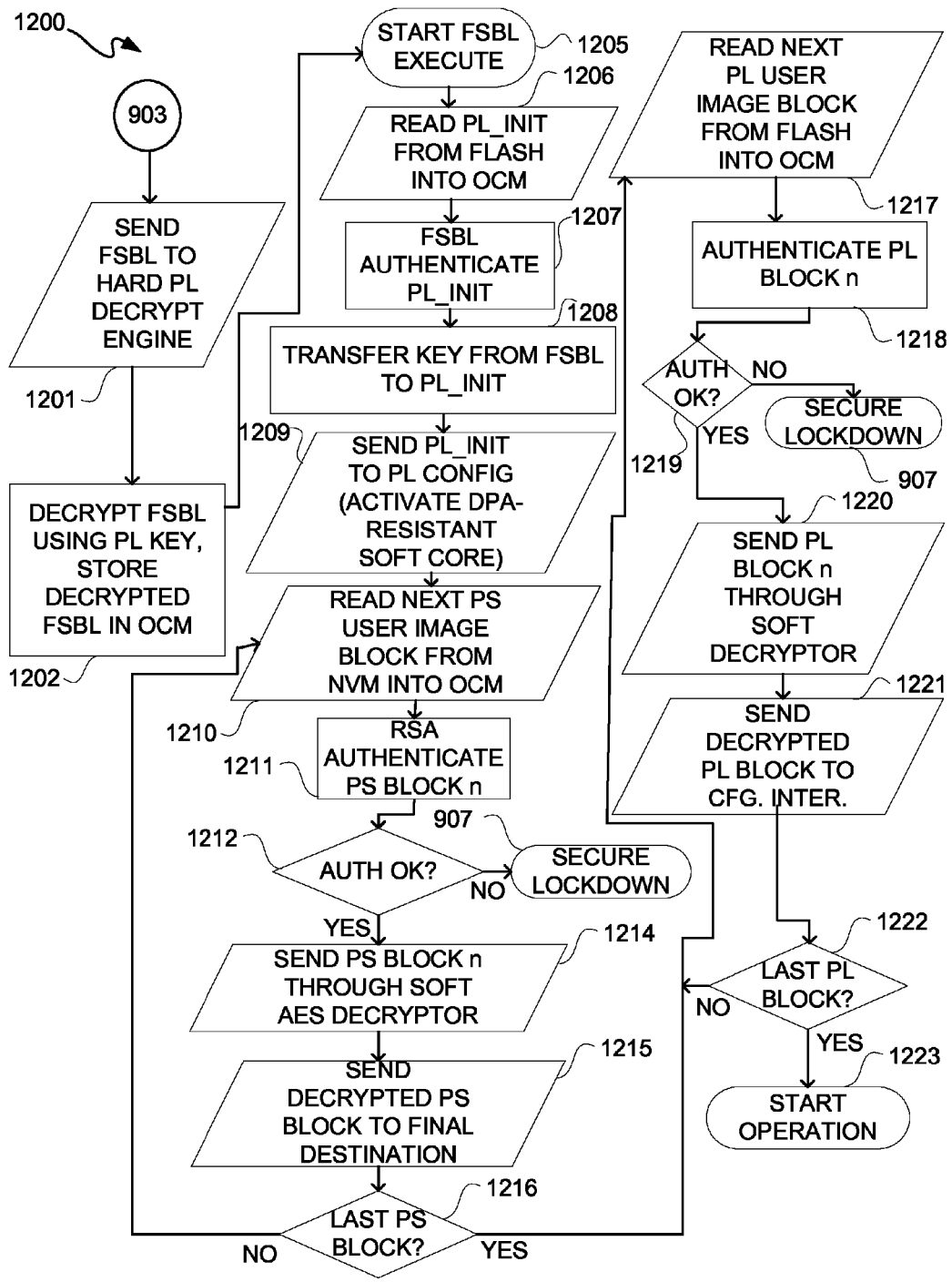
FIG. 12 is a flow diagram depicting an exemplary secure boot flow with anti-side channel attack capability.

Along those lines, FIG. 12 is a flow diagram depicting an exemplary secure boot flow 1200 with anti-side channel attack capability. Along those lines, secure boot flow 1200 has an anti-DPA flow portion. For purposes of clarity, secure boot flow 1200 is started at 903 of FIG. 10 after it is determined and FSBL 211 is encrypted; however, it should be understood that operations leading up to 903 may be performed as part of secure boot flow 1200. An FSBL 211 may be small enough to not allow enough side channel information to be collected on it. Along those lines, FSBL 211 size may be smaller than known capabilities of DPA attackers (e.g., smaller than the smallest data set needed by a DPA attacker to extract a secret AES key).

At 1201, such FSBL 211 is sent to a hardware-based decryption engine, such as PL 350 AES engine 352. As previously described, such FSBL 211 may be authenticated using an RSA public key hash stored in eFuses of eFuse array 354, and such authenticated FSBL may be controllably sent to and from PL 350 hardware-based decryptor, namely AES engine 352, via DevC 310.

At 1202, AES engine 352 to decrypt or decipher FSBL 211 using key 236. Recall, key 236 may be stored in BBRAM 304 or eFuse array 354. If key 236 is loaded into system 200, key 236 may be loaded in a secure environment, such as via JTAG 340. Such decrypted FSBL 211 may be stored in plaintext in OCM 227.

At 1205 execution of such plaintext FSBL 211 may start. At 1206, PL initialization image 212 is read from memory 210 into OCM 227. At 1207, authentication of PL initialization image 212 is performed, such as RSA authentication for example, using an AC, for example RSA code, in FSBL 211 as described elsewhere herein. Along those lines, FSBL 211 may contain a key, such as an AES key, for RSA authentication or pre-authentication at 1207. Because FSBL 211 may be as small as possible, such AES key may be for a first user image block only for example. In other words, FSBL 211 may be kept as small as possible, which may including deferring one or more operations and/or functions to an SSBL and/or subsequent bootloader with respect to FSBL 211.

At 1208, key 237 may be transferred from FSBL 211 to PL initialization image 212. At 1209, PL initialization image 212 may be sent to PL configuration memory 356 to instantiate or activate a DPA resistant soft decryptor core, such as a soft AES engine 231. For example, PL initialization image 212 may contain configuration information for soft AES engine with key rolling. Key 237 may be used for all subsequent pre-authentications for all subsequent image loads using AES engine 231. Additionally, PL initialization image 212 may include other security functions for instantiation in FPGA programmable fabric 357, including without limitation a security monitor. Writes to configuration memory 356 may be via ICAP 390. Flow control may thus send authenticated user image blocks to PL 350 via AXI interface 311.

At 1210, a user image block of user image 213 may read from memory 210 to OCM 227 under control of PS 300. For purposes of clarity by way of example, it shall be assumed that such image block is a PS image block. User image 213 may be broken into blocks, where each block is pre-authenticated by a key of FSBL 211. Such user image may further be broken up into encryption blocks separate separated for each key using key rolling. Each of such blocks or sub-blocks may be decrypted by decryptor 231. User image 213 may contain one or more software images for PS 300 and/or one or more user configuration streams or images for PL 350.

At 1211, under control of PS 300, RSA authentication of a PL image block of a user image may be performed. At 1212, it may be determined whether such RSA authentication at 1211 passed. If authentication did not pass as determined at 1212, then a secure lockdown may be invoked at 907. If, however, authentication did pass as determined at 1212, at 1214 such authenticated PL image block may be sent through decryptor 231, such as a soft AES decryptor. At 1215, such decrypted PL image block may be sent to a final destination therefor in PS 300.

At 1216, it is determined whether such PS image block just processed was a last of one or more PS image blocks of user image 213 to be processed. If at 1216 it is determined that such a recently processed PS image block was not the last one, then at 1210 a next PS image block is obtained for processing as previously described. If, however, at 1216 it is determined that such PS image block just processed was the last of such PS image blocks to be processed, then at 1217 a next PL image block is read from user image 213 in memory 210 and such read PL image block is transferred into OCM 227.

At 1218, RSA authentication of such PL image block may be performed. At 1219, it may be determined whether such authentication was successful. If it is determined at 1219 that authentication failed, then at 907 a secure lockdown may be invoked. If, however, at 1219 it is determined that authentication was successful, then at 1220 such PL image block authenticated may be sent through soft decryptor 231 for decryption, such as AES decryption for example.

At 1221, such decrypted configuration information of PL image block may be sent to ICAP 390 for instantiation in configuration memory 356. At 1222, it may be determined whether such PL image block process at 1221 was a last of one or more PL image blocks to be processed. If at 1222 it is determined that such PL image block just processed was not the last one, a next PL image block may be read at 1217 for processing as previously described. If, however, at 1222 it is determined that such PL image block just processed was the last one to be processed of user image 213, then at 1223 FPSoC 220 may be started for normal operation as configured with such PS and/or PL image blocks.

In other configurations, a soft decryptor core may be used for pre-authentication in PL 350. Such soft decryptor core may interface directly to nonvolatile memory 210 via pins of PL 350. Furthermore, such soft decryptor core may be an AES core, which is intrinsically DPA resistant and does not require pre-authentication or key rolling. Furthermore, in other configurations L2 cache may be used as a buffer for authentication of blocks.

While the foregoing describes exemplary apparatus(es) and/or method(s), other and further examples in accordance with the one or more aspects described herein may be devised without departing from the scope hereof, which may be determined by the claims that follow and equivalents thereof. Claims listing steps do not imply any order of the steps. Trademarks are the property of their respective owners.

What is claimed is:

1. A system, comprising:
   a system-on-chip ("SoC") having dedicated hardware including a processing unit,
   a first internal memory, a second internal memory, an authentication engine, and a decryption engine;
   a storage device coupled to the SoC;
   wherein the storage device has access to a boot image including a configuration information;
   wherein the first internal memory has boot code stored therein;
   wherein the boot code is for a secure boot of the SoC;
   wherein the boot code is configured to cause the processing unit to control the secure boot;
   wherein the SoC comprises a field programmable system-on-chip ("FPSoC");
   wherein the boot code under control of the processing unit is configured to authenticate a first stage bootloader ("FSBL") of the boot image; and
   wherein the FSBL is configured for pre-authentication by the decryption engine to limit an amount of data of the FSBL to mitigate against Differential Power Analysis;
   wherein the boot image further includes a second stage bootloader ("SSBL"), the boot image having a first partition for the FSBL and a second partition for the SSBL; and
   wherein the configuration information is for a decryptor for authentication of the FSBL.

2. The system according to claim 1, wherein the boot code under control of the processing unit is configured to determine validity of a boot header of the boot image.

3. The system according to claim 2, wherein at least one of the FSBL and the SSBL includes the configuration information for configuration memory of programmable logic fabric of the FPSoC.

4. The system according to claim 1, wherein:
   the first internal memory comprises mask programmed memory; and the boot code is mask programmed for storage in the first internal memory.

5. The system according to claim 1, wherein:
the FPSoC has lockable control registers; and
the boot code under control of the processing unit is configured to lock the lockable control registers to prohibit changing state of the lockable control registers of the FPSoC.

6. The system according to claim 1, wherein:
the FPSoC has lockable control registers; and
the boot code under control of the processing unit is configured to lock the lockable control registers to limit access to subsystems of the FPSoC.

7. The system according to claim 6, wherein the subsystems include the first internal memory, the second internal memory, the authentication engine, and the decryption engine, as well as any and all test access chains, device configuration circuitry and configuration control registers of the lockable control registers.

8. The system according to claim 7, wherein the device configuration circuitry includes a direct memory access controller coupled to internal interfaces of the FPSoC for moving partitions of the boot image.

9. The system according to claim 1, wherein:
the first internal memory comprises nonvolatile memory;
the first internal memory is programmed with at least one key;
the first internal memory is programmed with control bits to select the secure boot and to disable test access subsystems; and
wherein the test access subsystems include two independent chains.

10. A method of booting a system-on-chip ("SoC"), comprising:
accessing a boot code stored in the SoC under control of a processing unit of the SoC for a secure boot mode;
executing the boot code under control of the processing unit;
wherein the boot code is stored in nonvolatile memory of the SoC;
wherein the executing of the boot code comprises:
accessing the nonvolatile memory of the SoC to obtain boot information;
determining validity of the boot information;
if the boot information is determined to be valid, accessing a storage device coupled to the SoC having a boot image;
loading a boot header of the boot image; and
validating the boot header of the boot image;
wherein the SoC comprises a field programmable system-on-chip ("FPSoC");
wherein for the secure boot mode, having validated the boot header, the method further comprises:
loading a first stage bootloader ("FSBL") of the boot image into volatile memory of the FPSoC;
pre-authenticating the FSBL with a hardware decryption engine to limit an amount of data of the FSBL to mitigate against Differential Power Analysis;
instantiating a decryptor in the FPSoC with a configuration information from the boot image for authentication of the FSBL;
authenticating the FSBL;
loading a second stage bootloader ("SSBL") of the boot image into volatile memory of the FPSoC; and
authenticating the SSBL; and
wherein the boot image further includes a second stage bootloader ("SSBL"), the boot image having a first partition for the FSBL and a second partition for the SSBL.

11. The method according to claim 10, wherein the executing of the boot code further comprises:
locking a test access port;
locking configuration interfaces of the FPSoC not used for the secure boot mode; and
unlocking subsystems of the FPSoC used for the secure boot;
wherein the subsystems include device configuration circuitry and the hardware decryption engine.

12. The method according to claim 11, further comprising:
providing the FSBL to the hardware decryption engine of the FPSoC via an internal interface of the FPSoC; and
decrypting the FSBL with the hardware decryption engine.

13. The method according to claim 12, further comprising:
separating the configuration information for a configuration memory of the FPSoC into a first portion and a second portion;
wherein the first portion is unencrypted and the second portion is encrypted;
authenticating the first portion using code in the FSBL;
instantiating the decryptor in the configuration memory using the first portion;
decrypting the second portion using key rolling;
wherein an initial key is located in the FSBL or generated by a Physically Unclonable Function in the FPSoC; and
wherein the initial key is transferred into the first portion for use by the decryptor.

14. The method according to claim 11, further comprising:
requesting another image after authenticating the FSBL;
authenticating the other image; and
determining a user type for use of the FPSoC with the other image.

15. The method according to claim 14, wherein the user type is associated with one of at least three user modes selected comprising:
activating debug and test ports and maintaining the hardware decryption engine activated for a first user mode of the at least user modes;
deactivating the hardware decryption engine and maintaining the debug and test ports deactivated for a second user mode of the at least user modes; and
activating the debug and test ports and deactivating the hardware decryption engine for a third user mode of the at least user modes.

* * * * *